United States Patent
Chen et al.

(10) Patent No.: US 12,278,508 B2
(45) Date of Patent: Apr. 15, 2025

(54) SINGLE INDUCTOR MULTIPLE OUTPUT CHARGER FOR MULTIPLE BATTERY APPLICATIONS

(71) Applicant: Renesas Electronics America Inc., Milpitas, CA (US)

(72) Inventors: Yen-Mo Chen, Morrisville, NC (US); Sungkeun Lim, Cary, NC (US); Qian Sun, Milpitas, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 53 days.

(21) Appl. No.: 16/901,673

(22) Filed: Jun. 15, 2020

(65) Prior Publication Data

US 2020/0395774 A1    Dec. 17, 2020

Related U.S. Application Data

(60) Provisional application No. 62/862,422, filed on Jun. 17, 2019.

(51) Int. Cl.
*H02J 7/00* (2006.01)
*H02J 3/38* (2006.01)

(52) U.S. Cl.
CPC ........ *H02J 7/00047* (2020.01); *H02J 7/0013* (2013.01); *H02J 7/0045* (2013.01); *H02J 7/007182* (2020.01); *H02J 3/38* (2013.01); *H02J 2207/20* (2020.01)

(58) Field of Classification Search
CPC .... H02J 7/00047; H02J 7/0013; H02J 7/0045; H02J 7/007182
USPC .................................................. 320/128, 140
See application file for complete search history.

(56) References Cited

U.S. PATENT DOCUMENTS

| | | | | |
|---|---|---|---|---|
| 4,020,243 A * | 4/1977 | Oldford | ............. | H01M 6/5044 324/426 |
| 4,034,762 A * | 7/1977 | Cosens | ................. | A61B 18/12 606/50 |
| 4,066,996 A * | 1/1978 | Davis | ...................... | B60T 13/74 340/687 |
| 4,224,383 A * | 9/1980 | Taylor | ................ | H01M 50/289 429/7 |
| 4,238,722 A * | 12/1980 | Ford | ................... | H02H 11/006 320/DIG. 15 |
| 4,345,304 A * | 8/1982 | Penney | ................... | F21L 4/085 362/183 |
| 4,463,283 A * | 7/1984 | Penney | .................. | F21L 4/085 315/86 |
| 4,930,997 A * | 6/1990 | Bennett | .................. | A61M 1/84 604/319 |
| 4,943,770 A * | 7/1990 | Ashley-Rollman | .... | G01V 3/107 128/207.14 |

(Continued)

*Primary Examiner* — John T Trischler
(74) *Attorney, Agent, or Firm* — Foley & Lardner LLP

(57) ABSTRACT

A battery charger is described that can support multiple battery applications with a single USB type-C port. An architecture can include a single charger transferring power to multiple battery stacks. The architecture can include a plurality of battery stacks each respectively housed in a distinct electronic device. The architecture is expandable from one charger with one USB type-C port coupled to a plurality of battery stacks, to a plurality of chargers with respective USB type-C ports all coupled to a plurality of battery stacks respectively housed in distinct electronic devices.

19 Claims, 12 Drawing Sheets

(56) References Cited

U.S. PATENT DOCUMENTS

| | | | | |
|---|---|---|---|---|
| 5,057,762 A * | 10/1991 | Goedken | H02J 7/00041 | 320/160 |
| 5,117,173 A * | 5/1992 | Oliva | H01M 10/48 | 320/160 |
| 5,166,596 A * | 11/1992 | Goedken | H02J 7/007194 | 320/160 |
| 5,200,644 A * | 4/1993 | Kobayashi | H02J 9/061 | 307/103 |
| 5,545,933 A * | 8/1996 | Okamura | H02J 7/0013 | 361/300 |
| 5,640,078 A * | 6/1997 | Kou | H02J 9/061 | 320/124 |
| 5,666,006 A * | 9/1997 | Townsley | H02J 7/0024 | 320/124 |
| 5,717,309 A * | 2/1998 | Cho | H02J 7/0013 | 320/160 |
| 5,955,867 A * | 9/1999 | Cummings | H02J 7/00 | 320/160 |
| 5,982,050 A * | 11/1999 | Matsui | H02J 7/0016 | 340/636.15 |
| 6,081,101 A * | 6/2000 | Yang | H02J 7/007194 | 320/154 |
| 6,226,190 B1 * | 5/2001 | Balakrishnan | H02M 3/33507 | 363/21.13 |
| 6,229,349 B1 * | 5/2001 | Franckart | B61L 1/20 | 327/80 |
| 6,864,669 B1 * | 3/2005 | Bucur | H02J 7/0068 | 323/268 |
| 6,873,133 B1 * | 3/2005 | Kavounas | H02J 7/0024 | 320/103 |
| 7,525,320 B2 * | 4/2009 | Takami | A61B 1/00032 | 348/45 |
| 7,839,121 B2 * | 11/2010 | Kim | H02J 7/0024 | 320/124 |
| 7,854,203 B2 * | 12/2010 | Kumar | B60L 15/2045 | 105/49 |
| 8,072,187 B2 * | 12/2011 | Wu | H02J 7/00302 | 320/140 |
| 8,159,181 B2 * | 4/2012 | Greyling | H02M 3/157 | 323/224 |
| 8,222,866 B2 * | 7/2012 | Sugimoto | B60L 50/40 | 320/135 |
| 8,330,419 B2 * | 12/2012 | Kim | H01M 10/4257 | 320/120 |
| 8,427,106 B2 * | 4/2013 | Kim | H01M 10/482 | 320/120 |
| 8,441,228 B2 * | 5/2013 | Brabec | H02J 7/342 | 180/65.21 |
| 8,452,490 B2 * | 5/2013 | Lakirovich | B60L 1/08 | 320/108 |
| 8,541,905 B2 * | 9/2013 | Brabec | B60L 53/00 | 320/116 |
| 8,816,613 B2 * | 8/2014 | Lee | B60L 3/0046 | 318/140 |
| 8,847,553 B2 * | 9/2014 | Bohan, Jr. | H01M 10/4221 | 320/134 |
| 8,981,710 B2 * | 3/2015 | Hintz | H02M 3/1582 | 320/134 |
| 9,102,241 B2 * | 8/2015 | Brabec | B60L 58/22 | |
| 9,199,543 B2 * | 12/2015 | Brabec | H02J 7/342 | |
| 9,209,500 B2 * | 12/2015 | Kim | H01M 10/425 | |
| 9,219,369 B2 * | 12/2015 | Mehta | H02J 7/0042 | |
| 9,223,372 B2 * | 12/2015 | Hintz | B60L 53/63 | |
| 9,231,424 B2 * | 1/2016 | Kawaguchi | B60L 50/40 | |
| 9,263,862 B2 * | 2/2016 | Chang | H02M 1/4241 | |
| 9,343,950 B2 * | 5/2016 | Kayama | H02M 1/10 | |
| 9,385,553 B2 * | 7/2016 | Aiura | H02J 7/0068 | |
| 9,511,679 B2 * | 12/2016 | Izumi | H02J 7/0071 | |
| 9,680,323 B2 * | 6/2017 | Ramorini | H02J 7/00 | |
| 9,694,697 B2 * | 7/2017 | Brabec | H02M 3/1582 | |
| 9,711,984 B2 * | 7/2017 | Yoshida | H02J 7/02 | |
| 9,715,244 B2 * | 7/2017 | Lim | H02J 7/0068 | |
| 9,739,429 B2 * | 8/2017 | Bah | F21L 4/08 | |
| 9,843,206 B2 * | 12/2017 | Sato | H02J 7/0045 | |
| 9,973,017 B2 * | 5/2018 | Kudo | H02J 7/00 | |
| 10,033,372 B2 * | 7/2018 | Noguchi | H02M 3/155 | |
| 10,116,153 B2 * | 10/2018 | Chen | H02J 50/10 | |
| 10,164,448 B2 * | 12/2018 | Tanaka | H02J 3/381 | |
| 10,193,192 B2 * | 1/2019 | Gagneur | H01M 10/482 | |
| 10,211,648 B2 * | 2/2019 | Hasenkopf | H02J 7/0024 | |
| 10,243,376 B2 * | 3/2019 | Yu | H02J 9/061 | |
| 10,250,059 B2 * | 4/2019 | Aldehayyat | H02J 7/0068 | |
| 10,270,339 B2 * | 4/2019 | Lee | H02M 3/158 | |
| 10,293,702 B2 * | 5/2019 | Tu | B60L 3/0046 | |
| 10,305,468 B2 * | 5/2019 | Noguchi | H02M 3/07 | |
| 10,348,100 B2 * | 7/2019 | Cao | H02J 7/0019 | |
| 10,363,828 B1 * | 7/2019 | Shen | B60L 1/003 | |
| 10,377,250 B2 * | 8/2019 | Lee | B60L 53/22 | |
| 10,404,095 B2 * | 9/2019 | Sakamoto | H02J 9/062 | |
| 10,446,880 B2 * | 10/2019 | Sung | H01M 50/512 | |
| 10,486,683 B2 * | 11/2019 | Ito | B60L 15/007 | |
| 10,498,145 B2 * | 12/2019 | Gagneur | H02J 7/0014 | |
| 10,500,970 B2 * | 12/2019 | Kawamura | H01M 10/48 | |
| 10,518,725 B2 * | 12/2019 | Masui | H02M 3/33584 | |
| 10,523,026 B2 * | 12/2019 | Matsushita | B60L 53/14 | |
| 10,658,855 B2 * | 5/2020 | Sato | H02J 7/02 | |
| 10,770,912 B2 * | 9/2020 | Chen | H02J 7/00712 | |
| 10,847,991 B2 * | 11/2020 | He | H02J 7/00 | |
| 10,936,032 B2 * | 3/2021 | Liu | G06F 13/4282 | |
| 11,014,680 B2 * | 5/2021 | Sun | H02J 7/34 | |
| 11,070,073 B2 * | 7/2021 | Tiedtke | H02J 7/0068 | |
| 11,088,549 B2 * | 8/2021 | Lim | H02J 7/0045 | |
| 11,114,881 B2 * | 9/2021 | Jeong | H02J 7/007182 | |
| 11,133,702 B2 * | 9/2021 | Izawa | B60L 3/04 | |
| 11,190,038 B2 * | 11/2021 | Jang | H02J 7/0045 | |
| 11,228,190 B2 * | 1/2022 | Tiedtke | B60R 16/033 | |
| 11,239,677 B2 * | 2/2022 | Lim | H02J 7/0013 | |
| 11,243,551 B1 * | 2/2022 | Liang | G05F 1/46 | |
| 11,245,332 B1 * | 2/2022 | Houston | H02M 1/32 | |
| 11,248,893 B2 * | 2/2022 | Rastegar | F42C 11/008 | |
| 11,251,637 B2 * | 2/2022 | Tiedtke | B60L 58/12 | |
| 11,251,639 B2 * | 2/2022 | Chen | H02J 7/0045 | |
| 11,251,707 B2 * | 2/2022 | Chen | H02J 7/007 | |
| 11,322,936 B2 * | 5/2022 | Zhou | H02J 7/00 | |
| 11,342,760 B2 * | 5/2022 | Ohashi | H02J 7/00032 | |
| 11,368,027 B2 * | 6/2022 | Kwak | H02J 7/00 | |
| 11,387,659 B2 * | 7/2022 | Su | H02M 3/156 | |
| 11,387,667 B2 * | 7/2022 | Nibir | H02J 7/007182 | |
| 11,418,048 B2 * | 8/2022 | Lim | H02J 7/0071 | |
| 11,418,118 B1 * | 8/2022 | Houston | H02M 1/0003 | |
| 11,437,828 B2 * | 9/2022 | Kuranuki | H02J 7/02 | |
| 11,456,611 B2 * | 9/2022 | Gambetta | H02M 3/1582 | |
| 11,476,691 B2 * | 10/2022 | Liu | H02J 7/345 | |
| 11,509,146 B1 * | 11/2022 | Zhang | H02M 1/0067 | |
| 2002/0079865 A1 * | 6/2002 | Thomas | H02H 9/042 | 320/136 |
| 2002/0089307 A1 * | 7/2002 | Yang | G06F 1/263 | 320/116 |
| 2003/0137304 A1 * | 7/2003 | Danylyk | C02F 1/46 | 324/427 |
| 2003/0223227 A1 * | 12/2003 | Levine | F21L 4/08 | 362/399 |
| 2004/0046673 A1 * | 3/2004 | Kovarik | G01R 31/388 | 324/435 |
| 2004/0124716 A1 * | 7/2004 | Shirato | H02M 3/155 | 307/130 |
| 2005/0001593 A1 * | 1/2005 | Kawasumi | H02J 7/0018 | 320/132 |
| 2005/0052154 A1 * | 3/2005 | Kavounas | H02J 7/345 | 320/116 |
| 2006/0232667 A1 * | 10/2006 | Takami | A61B 1/0684 | 348/69 |
| 2007/0188126 A1 * | 8/2007 | Dickson | H02J 7/0045 | 320/104 |
| 2007/0216355 A1 * | 9/2007 | Kim | H02J 7/0024 | 320/128 |
| 2007/0253225 A1 * | 11/2007 | Baurle | H02M 3/07 | 363/16 |
| 2008/0036419 A1 * | 2/2008 | Cook | H02J 7/0031 | 320/103 |

(56) References Cited

U.S. PATENT DOCUMENTS

| | | | | |
|---|---|---|---|---|
| 2008/0219032 A1* | 9/2008 | Stancu | H02M 3/1582 | 363/21.01 |
| 2009/0115374 A1* | 5/2009 | Noda | H02J 1/10 | 320/138 |
| 2010/0001682 A1* | 1/2010 | Dickson | H02J 7/0042 | 320/107 |
| 2010/0123428 A1* | 5/2010 | Wu | H02J 7/0013 | 320/102 |
| 2010/0149840 A1* | 6/2010 | Hayasaki | B41J 2/435 | 363/21.09 |
| 2010/0194344 A1* | 8/2010 | Greyling | H02M 3/157 | 320/128 |
| 2010/0219794 A1* | 9/2010 | Sugimoto | H02J 7/0024 | 320/128 |
| 2010/0261043 A1* | 10/2010 | Kim | H02J 7/0024 | 429/61 |
| 2010/0264893 A1* | 10/2010 | Li | H02J 1/10 | 307/43 |
| 2011/0025124 A1* | 2/2011 | Brabec | H02J 7/1423 | 307/9.1 |
| 2011/0025125 A1* | 2/2011 | Brabec | B60L 53/54 | 307/9.1 |
| 2011/0025126 A1* | 2/2011 | Brabec | B60L 58/15 | 307/9.1 |
| 2011/0140649 A1* | 6/2011 | Choi | H01M 10/465 | 320/112 |
| 2011/0144861 A1* | 6/2011 | Lakirovich | H02M 3/1582 | 320/108 |
| 2011/0156479 A1* | 6/2011 | Carroll | H02S 10/00 | 307/18 |
| 2012/0068537 A1* | 3/2012 | Hintz | B60L 50/40 | 307/43 |
| 2012/0091930 A1* | 4/2012 | Takahashi | H02J 7/1423 | 307/80 |
| 2012/0112693 A1* | 5/2012 | Kusch | B60L 53/22 | 320/109 |
| 2012/0126820 A1* | 5/2012 | Tan | H02J 7/0013 | 324/434 |
| 2012/0133310 A1* | 5/2012 | Lee | H02J 7/0024 | 320/117 |
| 2012/0256568 A1* | 10/2012 | Lee | B60L 7/26 | 429/150 |
| 2012/0286733 A1* | 11/2012 | Chang | H02J 7/0018 | 320/118 |
| 2012/0319493 A1* | 12/2012 | Kim | H01M 10/4207 | 307/80 |
| 2013/0062946 A1* | 3/2013 | Ferber, Jr. | H02J 7/0024 | 307/43 |
| 2013/0076301 A1* | 3/2013 | Bastami | H02J 7/00041 | 320/162 |
| 2013/0082661 A1* | 4/2013 | Bohan, Jr. | H01M 10/443 | 320/134 |
| 2013/0090797 A1* | 4/2013 | Izumi | H02J 7/04 | 701/22 |
| 2013/0154372 A1* | 6/2013 | Chang | H02M 1/4241 | 323/210 |
| 2013/0187612 A1* | 7/2013 | Aiura | H02J 7/0068 | 320/118 |
| 2013/0221897 A1* | 8/2013 | Brabec | H02J 7/0013 | 320/104 |
| 2013/0307917 A1* | 11/2013 | Hayasaki | H02M 3/3385 | 363/21.16 |
| 2013/0334878 A1* | 12/2013 | Brabec | H02M 3/1582 | 307/9.1 |
| 2014/0084862 A1* | 3/2014 | Kawaguchi | B60L 53/65 | 320/108 |
| 2014/0087215 A1* | 3/2014 | Kim | H01M 10/637 | 429/50 |
| 2014/0145504 A1* | 5/2014 | Kayama | H02M 1/32 | 307/23 |
| 2014/0266011 A1* | 9/2014 | Mehta | H02M 3/1584 | 320/107 |
| 2014/0285158 A1* | 9/2014 | Kawamura | H02J 7/0036 | 320/149 |
| 2014/0368041 A1* | 12/2014 | Tu | B60L 15/007 | 307/52 |
| 2015/0009657 A1* | 1/2015 | Bah | F21V 17/164 | 362/183 |
| 2015/0054753 A1* | 2/2015 | Morgan | H01M 10/425 | 345/173 |
| 2015/0137754 A1* | 5/2015 | Yang | H02J 7/02 | 320/109 |
| 2015/0192973 A1* | 7/2015 | Hintz | H02M 3/1582 | 307/80 |
| 2015/0263390 A1* | 9/2015 | Gagneur | H01M 50/574 | 429/61 |
| 2015/0329007 A1* | 11/2015 | Matsunaga | H01M 10/441 | 320/126 |
| 2015/0333550 A1* | 11/2015 | Takeda | H02J 3/32 | 320/134 |
| 2016/0065070 A1* | 3/2016 | Noguchi | H03K 17/162 | 323/271 |
| 2016/0087472 A1* | 3/2016 | Sattinger | H02J 7/02 | 320/108 |
| 2016/0099582 A1* | 4/2016 | Ramorini | H02J 7/00 | 320/162 |
| 2016/0118825 A1* | 4/2016 | Yoshida | H02M 3/158 | 323/271 |
| 2016/0202743 A1* | 7/2016 | Li | H02M 1/10 | 710/313 |
| 2016/0246316 A1* | 8/2016 | Lim | G05F 1/56 | |
| 2016/0254689 A1* | 9/2016 | Lee | H02J 7/00 | 320/107 |
| 2016/0285283 A1* | 9/2016 | Gagneur | H02J 7/0024 | |
| 2016/0352101 A1* | 12/2016 | Koo | H02J 1/12 | |
| 2016/0380455 A1* | 12/2016 | Greening | H02J 1/102 | 320/114 |
| 2017/0077729 A1* | 3/2017 | Sato | H02J 7/02 | |
| 2017/0110893 A1* | 4/2017 | Cao | H02J 7/0016 | |
| 2017/0279275 A1* | 9/2017 | Yamamoto | H02J 7/0013 | |
| 2017/0279284 A1* | 9/2017 | Lim | H02J 7/0045 | |
| 2017/0282745 A1* | 10/2017 | Kawamura | B60L 58/13 | |
| 2017/0338672 A1* | 11/2017 | Hasenkopf | H02J 7/0016 | |
| 2017/0366023 A1* | 12/2017 | Tanaka | H02J 7/35 | |
| 2018/0062415 A1* | 3/2018 | Chen | H02J 7/0047 | |
| 2018/0083467 A1* | 3/2018 | Sato | H02J 7/0045 | |
| 2018/0086330 A1* | 3/2018 | Ito | B60L 58/18 | |
| 2018/0219397 A1* | 8/2018 | Matsushita | H02J 7/342 | |
| 2018/0269697 A1* | 9/2018 | Zhang | H02J 7/00712 | |
| 2018/0323779 A1* | 11/2018 | Noguchi | H02M 3/07 | |
| 2018/0331564 A1* | 11/2018 | Song | H02J 7/02 | |
| 2018/0334118 A1* | 11/2018 | Masui | H02J 9/06 | |
| 2018/0354374 A1* | 12/2018 | Lee | B60L 53/20 | |
| 2019/0063891 A1* | 2/2019 | Rastegar | H02N 2/181 | |
| 2019/0100321 A1* | 4/2019 | Sun | H02S 40/30 | |
| 2019/0103805 A1* | 4/2019 | Zhu | H02J 7/02 | |
| 2019/0207392 A1* | 7/2019 | Luo | H02J 7/0071 | |
| 2019/0214831 A1* | 7/2019 | Kristjansson | G06F 1/263 | |
| 2019/0214837 A1* | 7/2019 | Kristjansson | H02J 7/0013 | |
| 2019/0356134 A1* | 11/2019 | Ohashi | H02J 7/0071 | |
| 2020/0006952 A1* | 1/2020 | Jang | H02J 1/102 | |
| 2020/0014219 A1* | 1/2020 | Thomson | B60L 50/64 | |
| 2020/0062140 A1* | 2/2020 | Zhou | B60L 50/64 | |
| 2020/0067335 A1* | 2/2020 | Lim | G06F 1/263 | |
| 2020/0099229 A1* | 3/2020 | Jeong | H01M 10/44 | |
| 2020/0144829 A1* | 5/2020 | Lee | H02J 7/0047 | |
| 2020/0171971 A1* | 6/2020 | Tiedtke | B60L 58/24 | |
| 2020/0177007 A1* | 6/2020 | Tiedtke | H02J 7/005 | |
| 2020/0177008 A1* | 6/2020 | Tiedtke | B60L 1/00 | |
| 2020/0244170 A1* | 7/2020 | Chen | H02M 3/1582 | |
| 2020/0295588 A1* | 9/2020 | Nibir | H02J 7/00711 | |
| 2020/0358295 A1* | 11/2020 | Lim | H02J 7/0013 | |
| 2020/0403426 A1* | 12/2020 | Chen | H02J 7/0068 | |
| 2021/0057929 A1* | 2/2021 | Li | H02J 7/0071 | |
| 2021/0066930 A1* | 3/2021 | Luo | H02J 7/0014 | |
| 2021/0066956 A1* | 3/2021 | Izawa | H02J 7/005 | |
| 2021/0175734 A1* | 6/2021 | Li | H02J 7/00712 | |
| 2021/0203179 A1* | 7/2021 | Gambetta | H02J 7/0068 | |
| 2021/0242693 A1* | 8/2021 | Long | H02J 7/007 | |
| 2021/0265842 A1* | 8/2021 | Chen | H02J 7/007182 | |

(56) References Cited

U.S. PATENT DOCUMENTS

| | | | | |
|---|---|---|---|---|
| 2021/0302015 | A1* | 9/2021 | Moufawad | F21V 33/0032 |
| 2021/0305816 | A1* | 9/2021 | Kuranuki | H01M 10/48 |
| 2021/0313813 | A1* | 10/2021 | Kuranuki | B60L 58/22 |
| 2021/0320504 | A1* | 10/2021 | Choi | H02J 7/0047 |
| 2021/0328514 | A1* | 10/2021 | Schleicher | H02J 7/0013 |
| 2022/0052534 | A1* | 2/2022 | Liang | H02J 50/10 |
| 2022/0097549 | A1* | 3/2022 | Oishi | B60L 53/11 |
| 2022/0102769 | A1* | 3/2022 | Shidore | H02J 7/00712 |
| 2022/0102999 | A1* | 3/2022 | Sporck | H02J 7/007182 |
| 2022/0109317 | A1* | 4/2022 | Tiedtke | B60L 1/00 |
| 2022/0115879 | A1* | 4/2022 | Kahn | H01M 10/4235 |
| 2022/0131398 | A1* | 4/2022 | Herranz | H02J 7/00032 |
| 2022/0140621 | A1* | 5/2022 | Kwon | H02J 7/00714 |
| | | | | 320/117 |
| 2022/0149644 | A1* | 5/2022 | Liu | H02J 7/0068 |
| 2022/0200322 | A1* | 6/2022 | Chong | H02J 7/00304 |
| 2022/0209546 | A1* | 6/2022 | Hall | B60L 53/60 |
| 2022/0216703 | A1* | 7/2022 | Kuranuki | H01M 10/48 |
| 2022/0231518 | A1* | 7/2022 | Kun | H02M 1/0054 |
| 2022/0274498 | A1* | 9/2022 | Huang | H02J 7/007 |
| 2022/0285964 | A1* | 9/2022 | Mitani | H02J 1/10 |
| 2022/0416558 | A1* | 12/2022 | Gambetta | H02J 7/0068 |
| 2023/0142751 | A1* | 5/2023 | Cho | H02J 1/06 |
| | | | | 320/107 |
| 2024/0136846 | A1* | 4/2024 | Choi | H02J 7/06 |
| 2024/0235245 | A9* | 7/2024 | Choi | H02M 1/4233 |
| 2024/0239219 | A1* | 7/2024 | Xue | B60L 53/22 |

* cited by examiner

SINGLE INDUCTOR MULTIPLE OUTPUT CHARGER FOR MULTIPLE BATTERY APPLICATIONS

CROSS-REFERENCE TO RELATED APPLICATIONS

The present application claims priority to U.S. Provisional Patent Application No. 62/862,422 filed Jun. 17, 2019, the contents of which are incorporated herein by reference in their entirety.

TECHNICAL FIELD

The present embodiments relate generally to consumer, industrial, and hand held computing, and more particularly to battery chargers for systems having two or more separate battery stacks.

BACKGROUND

Current battery charger products only support systems having a single USB type-C port and a single battery. Meanwhile, new systems are being developed that include subsystems with two or more battery stacks. Such systems cannot be supported by existing battery charger products. Accordingly, a solution to these and other problems is needed.

SUMMARY

One or more embodiments are directed to a battery charger that can support multiple battery applications with a single USB type-C port including a single-inductor multiple-output (SIMO) structure. An architecture according to one or more embodiments includes a single charger transferring power to multiple battery stacks. The architecture according or one or more embodiments includes a plurality of battery stacks each respectively housed in a distinct electronic device. The architecture according to one or more embodiments is expandable from one charger with one USB type-C port coupled to a plurality of battery stacks, to a plurality of chargers with respective USB type-C ports all coupled to a plurality of battery stacks respectively housed in distinct electronic devices.

An exemplary SIMO architecture according to one or more embodiments provides various advantage or advantages in at least the technical field. A SIMO architecture according to one or more embodiments reduces size while maintaining desired operation by allowing a single inductor to connect to multiple power outputs, thereby reducing the number of power inductors and associated electrical components required to realize the desired operation. According to certain aspects, advantages of the SIMO architecture include reducing significant cost associated with each power inductors, and reducing package and/or system size by reducing the number of external discrete components required to realize desired operation. External discrete components include but are not limited to any logical or electrical device connected, operatively coupled, or operatively coupleable to a power delivery controller. Reduction in system complexity from use of the SIMO architecture according to various embodiments may also reduce cost through a reduction in design and manufacturing associated with device having fewer electronic components.

One or more embodiments include a first inductor electrically coupled to a first inductor node, a first transistor electrically coupled to the first inductor node and a first output node, and a second transistor electrically coupled to the first inductor node and a second output node, a third transistor electrically coupled to the first output node and a first battery, and a fourth transistor electrically coupled to the second output node and a second battery.

One or more embodiments include obtaining one or more charging instructions at a charging device, determining whether to charge a first battery or a second battery in response to the obtained one or more charging instructions, operating the charging device in a first charging mode in accordance with a determination to charge the first battery, and operating the charging device in a second charging mode in accordance with a determination to charge the second battery.

One or more embodiments include obtaining a first operating characteristic associated with a first battery, and obtaining a second operating characteristic associated with a second battery. In one or more embodiments, the operating the charging device in the first charging mode includes determining whether the first operating characteristic satisfies a first condition, operating the charging device in a first conditional charging mode in accordance with a determination that the first operating characteristic satisfies the first condition, and operating the charging device in a second conditional charging mode in accordance with a determination that the first operating characteristic does not satisfy the first condition.

One or more embodiments include operating the charging device in the second charging mode by determining whether the second operating characteristic satisfies a second condition, operating the charging device in a third conditional charging mode in accordance with a determination that the second operating characteristic satisfies the second condition, and operating the charging device in a fourth conditional charging mode in accordance with a determination that the second operating characteristic does not satisfy the second condition.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present embodiments relate to a battery charger that can support multiple battery applications with a single Universal Serial Bus (USB) type-C port. In some embodiments, the batteries can have different voltage capacities. In some embodiments, the battery charging current for the batteries, and the current limits for each battery, can be controlled separately. In some embodiments, the architecture is modular such that the architecture can be extended to support multiple battery applications by adding additional charging modules and/or extended to support multiple USB Type-C port applications by adding additional charging modules. In some embodiments, the power supplied by the chargers can be summed. Exemplary control scheme implementations according to the present embodiments are flexible to support varying numbers of batteries and ports, including but not limited to USB Type-C ports.

Figure 1:
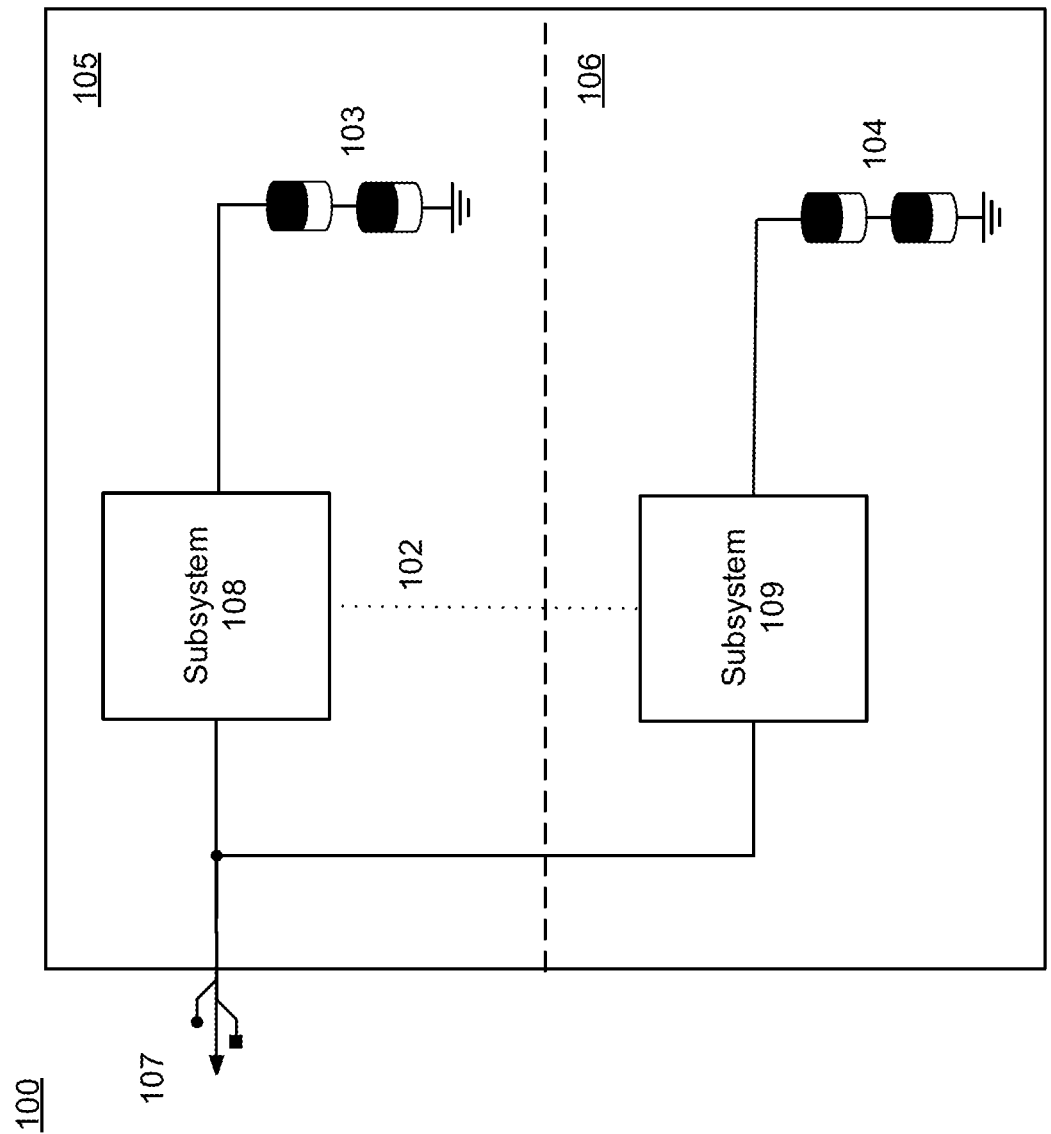
FIG. 1 is a top-level diagram illustrating aspects of an example system according to embodiments.

FIG. 1 is a top-level diagram illustrating aspects of an example system 100 according to embodiments. In some embodiments, system 100 can be and/or include a computing device such as a notebook computer (e.g. MacBook, Ultrabook, etc.), laptop computer, pad or tablet computer (e.g., iPad, Surface, etc.), cell-phone (e.g. Samsung Galaxy Z Flip phone etc.), a power bank, Universal Serial Bus (USB) ports, or any system using a battery and capable of receiving power from an adapter.

System 100 includes subsystems 108 and 109. One or both of these subsystems can include a CPU running a conventional operating system such as Windows or Apple OS, and can be an x86 processor from Intel, AMD or other manufacturers, as well as other processors made by Freescale, Qualcomm, DSPs, GPUs, etc. It should be apparent that system 100 can include many other components not shown such as solid state and other disk drives, memories, peripherals, displays, user interface components, etc.

In one example, system 100 can be a clamshell portable device. One such example of a clamshell portable device is the Samsung Galaxy Z Flip phone. This device has two foldably connected screens (e.g. 105 and 106 in FIG. 1) that can operate as one combined screen when fully opened. Alternatively, the phone can operate with one screen while the second screen is folded away. In this example, each screen 105 and 106 has its own subsystem 108 and 109.

In some embodiments, subsystem 109 in system 100 can be configured to implement a touch screen 106 configured for user input, while subsystem 108 in system 100 can implement a computing device that is operative in response to user inputs from subsystem 109 and generates a display on screen 105. In these and other embodiments, the screens and subsystems can be detachable and operate independently. For example, screen 105 in system 100 can detach from screen 106. While detached, each screen, because of the screen's independent subsystem, can operate under its own battery power.

According to certain aspects, system 100 in which the present embodiments can find particularly useful application has operational power needs that can exceed the power limits of technologies such as USB-A, for example over 60 watts. However, the present embodiments are not limited to applications in such systems.

As discussed above, subsystems 108 and 109 within system 100 each have their own battery stacks 103 and 104, respectively. Further, the subsystems 108 and 109 may communicate with each other through communication channel 102, but this is not necessary in all embodiments. The batteries 103 and 104 can have different storage capacities and can be charged separately via a power adapter connected to a single port 107 (e.g. USB-C) in one of the screens 105 or 106. In alternate embodiments, each subsystem can have their own port. Further, each subsystem can have different power requirements. For example, subsystem 108 can demand one amount of power, while subsystem 109 can demand a different amount of power. As such, the present application recognizes that there is a need to control battery charging current and voltage independently for each of the systems.

Figure 2:
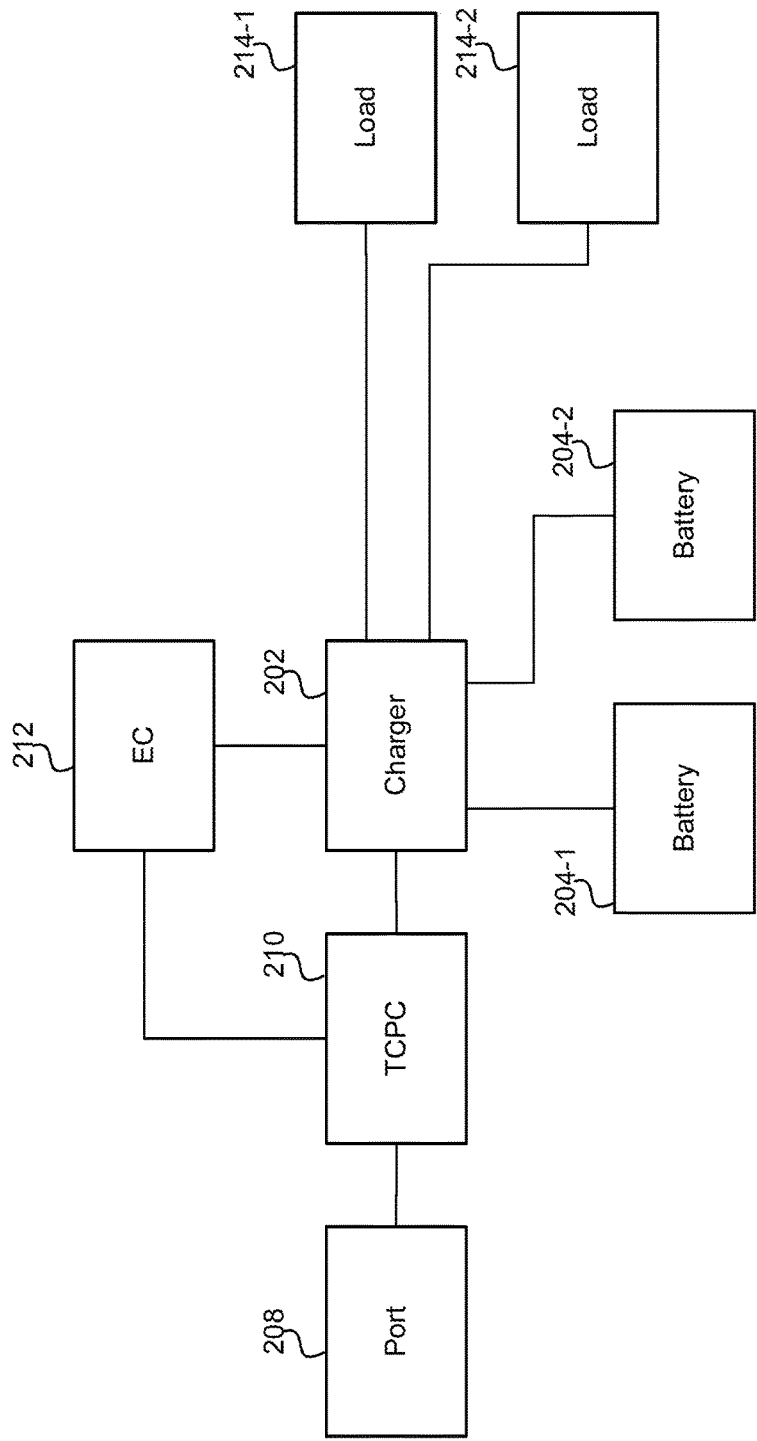
FIG. 2 is a block diagram illustrating aspects of a system for charging two batteries from a single adapter or port according to the present embodiments.

FIG. 2 is a block diagram illustrating aspects of a system for charging two batteries from a single adapter or port according to the present embodiments. FIG. 2 illustrates exemplary system 200 including exemplary charger 202. In some embodiments, system 200 includes one or more chargers.

In some embodiments, port 208 includes, but is not limited to, one or more USB ports, such as a USB Type C (USB C) ports or a USB Power Delivery (USB PD) port. In a USB Type C example such as that shown in FIG. 2, port 208 has an associated Type C port controller (TCPC) 210. The TCPC 210 includes functionality for at least detecting the presence and type of a device attached to port 108, controlling switches associated with connecting the attached device to other system 200 components, and for communicating port status to Embedded Controller (EC) 212 (e.g. via an I2C interface).

In some embodiments, EC 212 manages power configurations of system 200 (e.g. determining whether a power adapter is connected or not connected to port 108 and communicating the determination to the EC 212 from the TCPC 210), receiving battery status from one or more of batteries 204-1 and 204-2 (e.g. via a separate or incorporated fuel gauge circuit), and for communicating battery charging and other operational control information to charger 202 (e.g. via at least one SMbus interface). In some embodiments, the EC 212 can communicate with the TCPC 210 and the charger 202, including controllers housed respectively within the TCPC 210 and the charger 202 via known protocols such as I2C or SMBus, or other protocols which are known or may become known. For example, the EC 212 can receive information from the TCPC 210 operatively connected to the port 208 via controllers inside TCPC 210 or elsewhere regarding devices attached to the port 208. In some embodiments, the EC 212 can subsequently send control signals to the controllers for controlling the operations of the voltage regulator module 206 and battery charger module 202 in accordance with the information. In some embodiments, the EC 212 can communicate with one or more charger controllers housed within the charger 202 to control the overall operation of system 200 such that power can be delivered to a subsystem (e.g. system nodes 214-1 and 214-2 via an output voltage) and/or charge a battery (e.g. batteries 204-1 and 204-2).

As shown by way of example, system 200 includes the charger 202 operatively coupled to battery 204-1 and battery 204-2. In some embodiments, the charger 202 includes one or more buck-boost voltage DC (NVDC) chargers. In some embodiments, the charger 202 is configurable as an HPB charger or NVDC charger. In some embodiments, the charger 202 is compliant with Intel PROCHOT# and PSYS requirements. In some embodiments, the charger 202 includes an adapter current monitor and a battery discharging current monitor. In some embodiments, the charger 202 uses at least one NFET for one or more switches. In some embodiments, the charger 202 supports Battery Learn mode. In some embodiments, the charger 202 provides actively controlled inrush current to prevent FET damage. In some embodiments, the charger 202 includes SMBus programmable settings and high accuracy. In some embodiments, the charger 202 includes comprehensive protection features such as PROCHOT# indicator for system low voltage, adapter overcurrent, battery overcurrent, or system overheating, hardware-based adapter current, battery current limits and sudden battery removal in system Turbo mode. In some embodiments, the charger 202 includes multiple switching frequency options from 350 kHz to 1 MHz. In some embodiments, the charger 202 provides low quiescent current, an SMBus and is auto-increment I2C compatible. In some embodiments, the charger 202 includes a Renesas Robust Ripple Regulator (R3) modulation scheme with light-load efficiency and fast dynamic response. In some embodiments, the charger 202 can be implemented in a 32 Ld 4×4 mm$^2$ QFN package. In some embodiments, the charger 202 is Pb-free (RoHS compliant). For example, the charger can be ISL95522 from Renesas Electronics America. In various embodiments, SIMO buck-boost or other SIMO topologies (e.g., SIMO buck or SIMO boost) may also be used for different applications.

According to certain general aspects, during operation of the system 200, when a power adapter is plugged into port 208, the charger 202 can be configured to charge batteries 204-1 and 204-2. In some embodiments, the charger 202 is adapted to convert power from the adapter to a voltage suitable for components of the system 200. In some embodiments, the charger 202 can supply power in a buck mode, a boost mode, a buck-boost mode, or other methods known in the art (e.g. using known PWM modulation signals provided to power MOSFETs). In some embodiments, the regulated output voltage supplied to batteries or loads can be a fixed 7-8V.

According to certain other general aspects, when a USB OTG device (e.g. a cell phone, etc.) is connected to port 208, charger 202 can be configured to manage the supply of power from one or more of battery 204-1 and 204-2 to port 208. In some embodiments, the charger 202 can operate in reverse to provide power in a reverse buck mode, a reverse boost mode, a reverse buck-boost mode, or other methods known in the art to output a regulated voltage to port 208 from one or more of battery 204-1 and 204-2. A regulated output voltage supplied to the OTG device can be the full OTG functionality range (e.g. providing OTG voltages from 5V to 20V). In some embodiments, the battery 204-1 and the battery 204-2 may be charged alternately. Further details of the charger 202 according to the present embodiments will be provided below. In some embodiments, the system 200 is included within a notebook computer (e.g. Ultrabook), and batteries 204-1 and 204-2 include at least one rechargeable 1S/2S/3S/4S (e.g. 1 cell, 2 cell, 3 cell, or 4 cell stack) Lithium-ion (Li-ion) battery.

Figure 3:
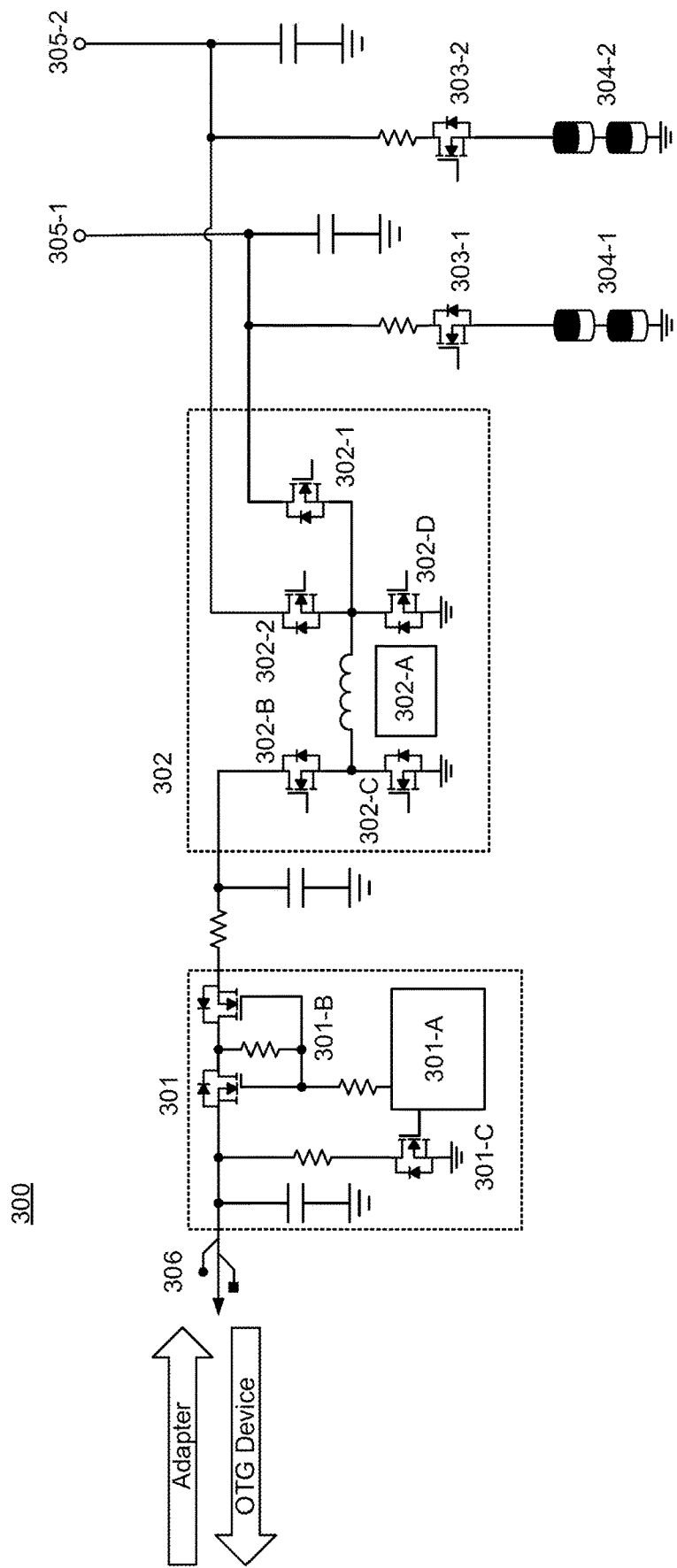
FIG. 3 is a schematic diagram illustrating an example battery charger for two or more systems and their corresponding battery stacks according to the present embodiments.

FIG. 3 is a schematic diagram illustrating an example battery charger for two or more systems and their corresponding battery stacks according to the present embodiments. FIG. 3 illustrates exemplary system 300 including exemplary power delivery and/or port detection ("PD") controller 301 and exemplary charger 302. In some embodiments, charger 302 provides an output voltage to system node 305-1, system node 305-2, battery 304-1, and battery 304-2. In some embodiments, the charger 302 provides system power to system node 305-1 and system node 305-2, and charging power to battery 304-1 and battery 304-2. In some embodiments, the system 300 supports bidirectional power flow to charge at least one of battery 304-1 and battery 304-2 (e.g. the adapter on port 306 is a source), or to supply power to an OTG device connected to port 306 (e.g. where the OTG device on port 306 is a sink). In some embodiments, at least one BGATE FET (i.e. battery control transistor) 303-1 is disposed between charger 302 and battery 304-1. In some embodiments, at least one BGATE FET (i.e. battery control transistor) 303-2 is disposed between charger 302 and battery 304-2. In some embodiments, one or more of system 300 generally and charger 302 specifically may incorporate logic to control one or more of the BGATE FET 303-1 and the BGATE FET 303-2. In some embodiments in accordance with the exemplary system 300, one or more internal drivers for one or more MOSFET drivers of the system are shared using multiplexers to increase simplicity and reduce the number of discrete components in system 300.

In some embodiments, port 306 is connected to the PD controller 301, which includes a PD-IC 301-A. Further, a port side capacitor (e.g. a 10 μF capacitor) can be used in exemplary embodiments. In some embodiments, the PD-IC 301-A can be implemented by a PD controller together with other components. In other embodiments, the PD-IC 301-A can be implemented by at least one of the Type C port controller TCPC 210, and a USB Power Delivery Controller R9A02G011 from Renesas Electronics America. Further, the PD controller 301 and some or all of the FETs 301-B and 301-C can be implemented together in a common integrated circuit in exemplary embodiments.

In some embodiments, the PD-IC 301-A controls a pair of back-to-back FETs 301-B and a single FET 301-C. When an adapter is not connected and instead a power consuming device (e.g. an OTG device) is connected to port 306, the PD-IC 301-A may control the FETs 301-B so as to couple the OTG voltage from the battery 304-1 and the battery 304-2 via the charger 302, the BGATE FET 303-1, and the BGATE FETs 303-2 to the port 306, in exemplary embodiments. When an adapter is connected to port 306, PD-IC 301-A may control the FETs 301-B so as to couple the adapter voltage via converter 302 to the chargers 302 and to provide at least one of the system nodes 305-1 and 305-2, and charging power to at least one of the battery 304-1 and the battery 304-2, in exemplary embodiments. In some embodiments, the PD-IC 301-A controls the FET 301-C to implement VBUS force discharge or bleed discharge to satisfy the USB PD requirement.

In some embodiments, the charger 302 supports unique voltage and current demands to supply a regulated voltage to at least one of battery 304-1 and battery 304-2. In some embodiments, system 300 includes at least one adapter-side sensing resistor and one battery-side sensing resistor. In some embodiments, charger 302 receives an input voltage and provides a regulated output voltage while also charging at least one of battery 304-1 and battery 304-2. In some embodiments, the charger 302 can be designed based on the maximum power required for the at least one subsystem. In some embodiments, system node 305-1 and system node 305-2 are respectively operatively coupled to one or more subsystems.

In some embodiments, the charger 302 includes a battery charger controller 302-A, as discussed above, and other components (e.g. an inductor and switching transistors or power MOSFETs). In some embodiments, charger 302 includes switching transistors 302-B, 302-C, 302-D, 302-1 and 302-2. In some embodiments, one or more of the switching transistors are power transistors. While a battery charger controller is described, the disclosure is not limited to battery charger controllers and can include buck-boost converters, boost converters, buck converters, integrated circuits with identical functionality and the like. For example, the controller can be implemented as one or more integrated circuits to which the switching transistors, associated drivers, and inductor are externally connected. In other embodiments, some or all of the switching transistors, and/or associated drivers, and the inductor can be integrated together with the battery charger controller in a single integrated circuit. It should be apparent that many different implementations of the battery charger controller together with other battery charger components are possible. The components can include high-side/low-side switching transistors connected to either end of an inductor, as is well known in the art. In some embodiments, one or more of system 300 generally and charger 302 specifically may incorporate logic to control one or more of the switching transistors 302-B, 302-C, 302-D, 302-1 and 302-2.

In some embodiments, the battery charger in FIG. 3 is configured to operate in an alternating charge cycle between a first battery and a second battery. In some embodiments an alternating charging cycle includes a first charging mode in which a first battery is at least partially charged while a second battery is at least partially isolated, followed by a subsequent charging mode in which the second battery is at least partially charged while the first battery is at least partially isolated. In some embodiments, an alternating cycle may repeat for a predetermined or an indefinite number of cycles. In some embodiments, the battery charger of FIG. 3 may be configured such that an alternating charging cycle may be strictly isolating, in which only one of a first or second load receives power from the charger at any time. In some embodiments, the battery charger of FIG. 3 may be configured such that an alternating charging cycle may not be strictly isolating, in which power provided to a first load from the charger at least partially occurs during or otherwise overlaps with providing power to a second load. In some embodiments, and as will become more apparent below, such a conditional charging or isolating mode can depend on relative voltages between battery 424-1 and 424-2, 434-1 and 434-2, 444-1 and 444-2, or 454-1 and 454-2.

In some embodiments, each charging mode provides a charging path across one charger switching transistor (e.g., Q4_1 transistor) and one battery control transistor (e.g., BGATE_1 transistor) pair. In some embodiments, each charging mode also provides a reverse blocking path across another charger switching transistor (e.g., Q4_2 transistor) and another battery control transistor (e.g., BGATE_2 transistor). It is to be understood that in various embodiments, the Q4_1/BGATE_1 and Q4_2/BGATE_2 transistor pairs may alternate between providing a charging path and providing a reverse blocking path to effect alternating charge cycling in accordance with present embodiments. A battery charger in accordance with exemplary embodiments may implement an alternating charging cycle with a buck, boost, or buck-boost transistor configuration. In some embodiments, a relationship between output voltage and supply voltage may influence the form of the transistor configuration. As used herein, the charging cycle may correspond to one or more PWM cycles, or portions thereof, in a PWM modulation scheme. In other embodiments, the charging cycle(s) and the PWM cycles may be completely independent of each other.

FIGS. 4A-F illustrate exemplary operation of system 300 as system 400, 410, 420, 430, 440, and 450, respectively. Each of these exemplary systems includes PD controller 401, a charger 402 connected to an output of the PD controller 401, and a port 406 connected to an input of the PD controller 301. The exemplary PD controller 401 of exemplary system 400 includes a PD-IC 401-A, a pair of back-to-back FETs 401-B, and a single FET 401-C. The exemplary charger 402 includes battery charger controller 402-A, switching transistors 402-B, 402-C, 402-D, 402-1 and 402-2 and an inductor coupled together in a buck-boost configuration. In some embodiments, the battery charger controller 402-A includes logic to activate or deactivate one or more of the switching transistors 402-B, 402-C, 402-D, 402-1 and 402-2, as well as the battery control transistors 403-1, 403-2, etc. In some embodiments, the battery charger controller 402-A may be operatively connected to at least one gate terminal of at least one of the switching transistors 402-B, 402-C, 402-D, 402-1 and 402-2 as well as battery control transistors 403-1, 403-2, etc. In some embodiments, at least one driver circuit, as known in the art or may become known, is operatively connected between the battery charger controller 402-A and a respective gate terminal of at least one of the switching transistors 402-B, 402-C, 402-D, 402-1 and 402-2. In some embodiments, EC 212 may directly or indirectly control operation of battery charger controller 402-A. In some embodiments, a transistor activation state includes providing a nonzero voltage to a transistor gate terminal. In some embodiments, a transistor deactivation state includes providing a ground voltage to a transistor gate terminal. In some embodiments, a transistor deactivation state includes providing a floating or high impedance voltage to a transistor gate terminal.

Figure 4A:
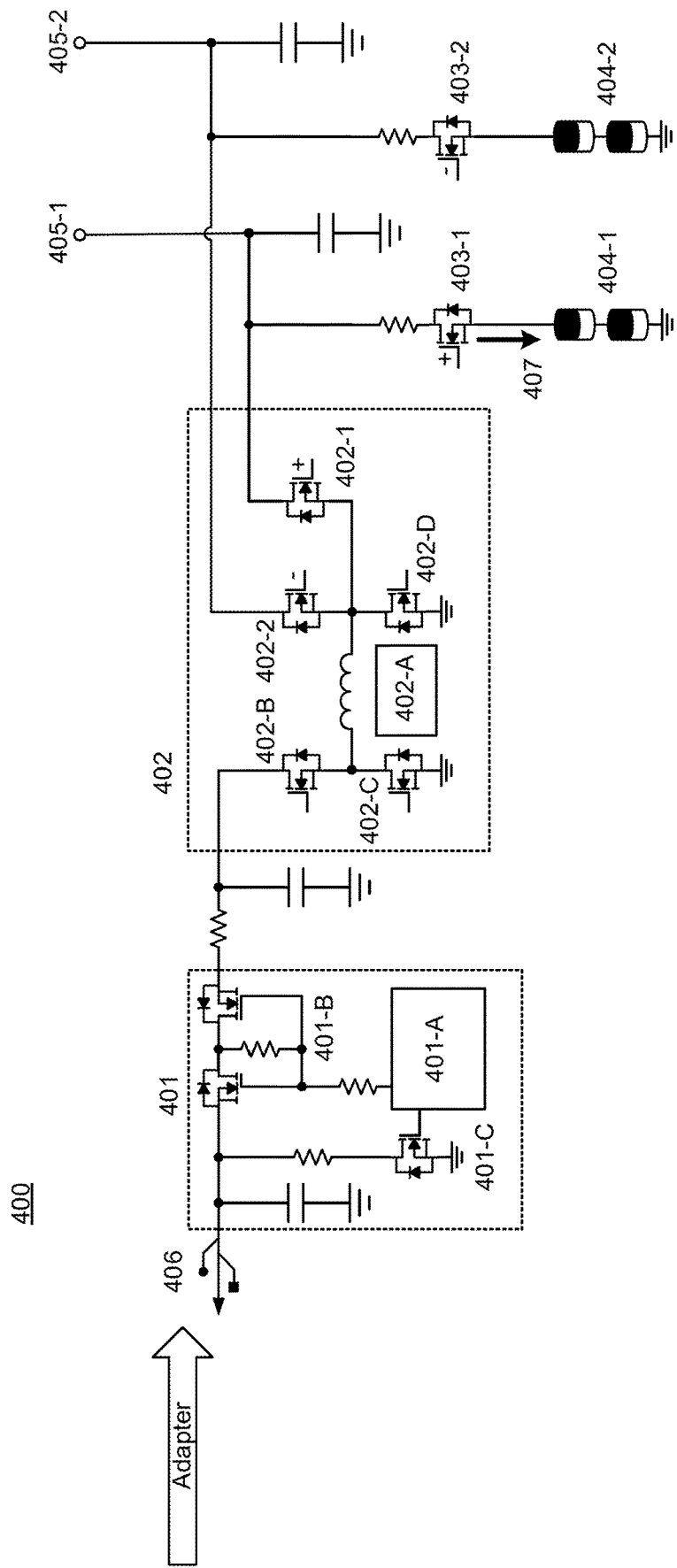
FIG. 4A illustrates an example operation of the battery charger in FIG. 3 in a first charging mode of a first battery.
Figure 4B:
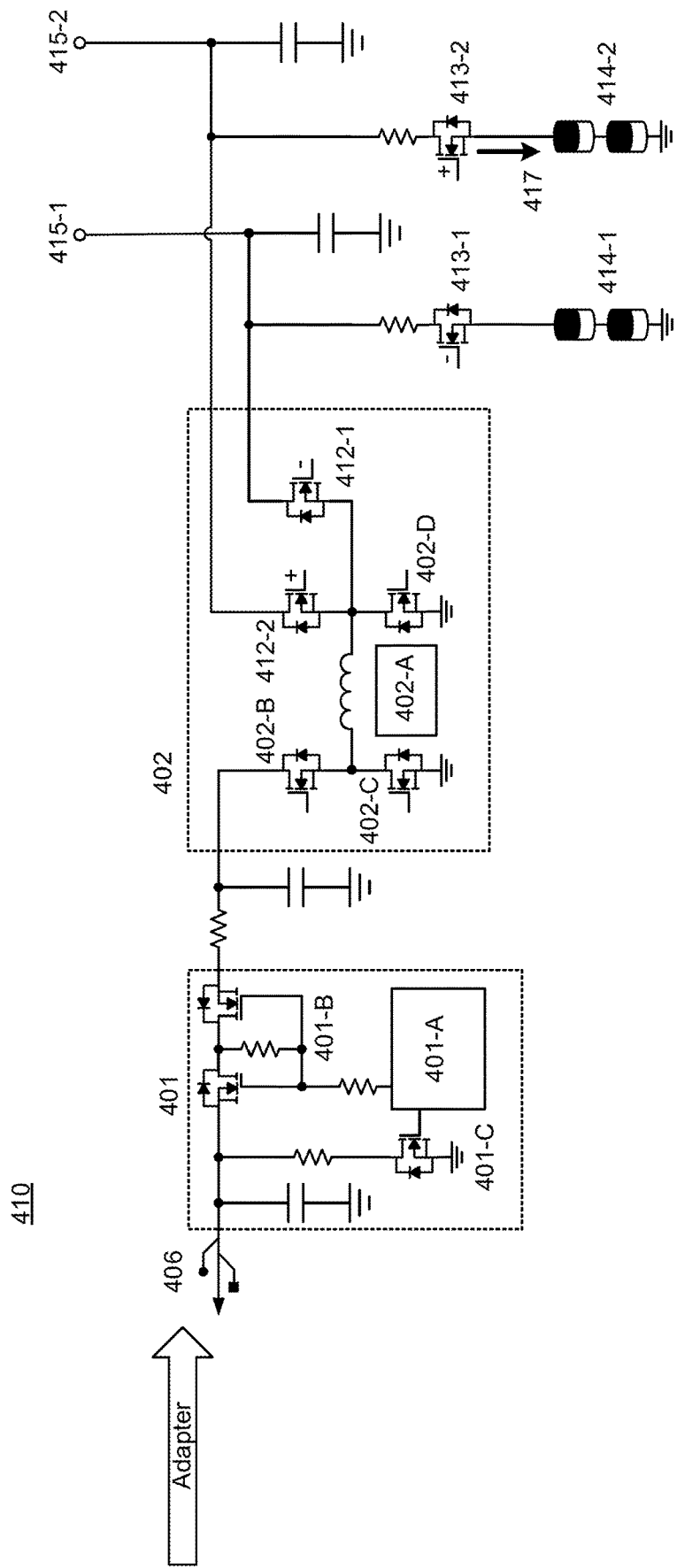
FIG. 4B illustrates an example operation of the battery charger in FIG. 3 in a second charging mode of a second battery.

FIGS. 4A-F illustrate exemplary charging modes for, but not limited to, alternating charging cycles in various exemplary embodiments. In these examples, FIGS. 4A-B represent alternating charging modes in a first exemplary embodiment, where the exemplary first charging mode of a first battery of FIG. 4A alternates with the second exemplary charging mode of a second battery of FIG. 4B. Thus, charging of the first battery may alternate with charging of the second battery by alternating between the first charging mode of FIG. 4A and the second charging mode of FIG. 4B. As will become more apparent from below, FIGS. 4C-F represent alternating charging modes in a second exemplary embodiment, where the exemplary first charging mode of a first battery of either FIG. 4C or FIG. 4D alternates with the second exemplary charging mode of a second battery of either FIG. 4E or FIG. 4F. Thus, charging of the first battery may alternate with charging of the second battery by alternating between either the first conditional charging mode of FIG. 4C or the second conditional charging mode of FIG. 4D, and either the third conditional charging mode of FIG. 4E or the fourth conditional charging mode of FIG. 4F.

FIG. 4A illustrates an example operation of the battery charger in FIG. 3 in a first charging mode of a first battery. Exemplary system 400 illustrates the exemplary charger 402 operating in a first charging mode delivering power to battery 404-1 and electrically isolating battery 404-2. In the exemplary first charging mode of the system 400, switching transistor 402-1 is activated with a predetermined positive gate voltage, switching transistor 402-2 is deactivated with a predetermined negative or ground gate voltage, battery control transistor 403-1 is activated with a predetermined positive gate voltage, and battery control transistor 403-2 is deactivated with a predetermined negative or ground gate voltage. In response, exemplary charging current 407 flows to battery 404-1 from charger 402 through switching transistor 402-1 and battery control transistor 403-1, and battery 404-2 is electrically isolated from charger 402 by switching transistor 402-2 and battery control transistor 403-2.

FIG. 4B illustrates an example operation of the battery charger in FIG. 3 in a second charging mode of a second battery. Exemplary system 410 illustrates the exemplary charger 402 operating in a second charging mode delivering power to battery 414-2 and electrically isolating battery 414-1. In the exemplary second charging mode of the system 410, switching transistor 412-1 is deactivated with a predetermined negative or ground gate voltage, switching transistor 412-2 is activated with a predetermined positive gate voltage, battery control transistor 413-1 is deactivated with a predetermined negative or ground gate voltage, and battery control transistor 413-2 is activated with a predetermined positive gate voltage. In response, exemplary charging current 417 flows to battery 414-2 from charger 402 through switching transistor 412-2 and battery control transistor 413-2, and battery 414-1 is electrically isolated from charger 402 by switching transistor 412-1 and battery control transistor 413-1.

FIGS. 4C-F illustrate exemplary operation of the battery charger in FIG. 3 in various conditional charging modes. In some embodiments, a conditional charging mode is conditioned at least upon a relative voltage level of a first battery with respect to a second battery.

Figure 4C:
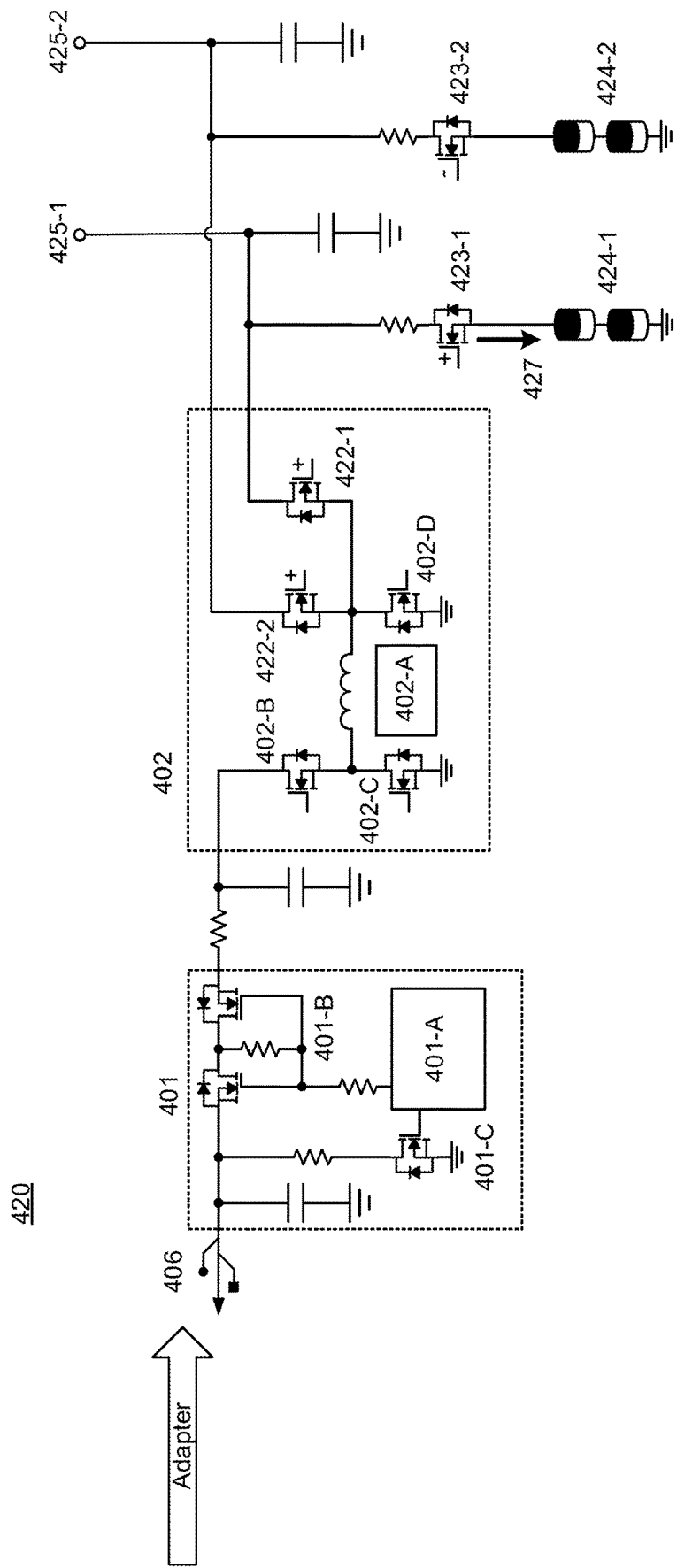
FIG. 4C illustrates an example operation of the battery charger in FIG. 3 in a first conditional charging mode of a first battery.

FIG. 4C illustrates an example operation of the battery charger in FIG. 3 in a first conditional charging mode of a first battery where the voltage level of battery 424-1 is greater than the voltage level of battery 424-2. Exemplary system 420 illustrates the exemplary charger 402 operating in a first conditional charging mode delivering power to battery 424-1 and electrically isolating battery 424-2. In the exemplary first conditional charging mode of the system 420, switching transistor 422-1 is activated with a predetermined positive gate voltage, switching transistor 422-2 is activated with a predetermined positive gate voltage, battery control transistor 423-1 is activated with a predetermined positive gate voltage, and battery control transistor 423-2 is deactivated with a predetermined negative or ground gate voltage. In response, exemplary charging current 427 flows to battery 424-1 from charger 402 through switching transistor 422-1 and battery control transistor 423-1, and battery 424-2 is electrically isolated from charger 402 by battery control transistor 423-2. In some embodiments in accordance with the exemplary system 420, power received at the port 406 from a power adapter is delivered to both the system node 425-1 and the system node 425-2.

Figure 4D:
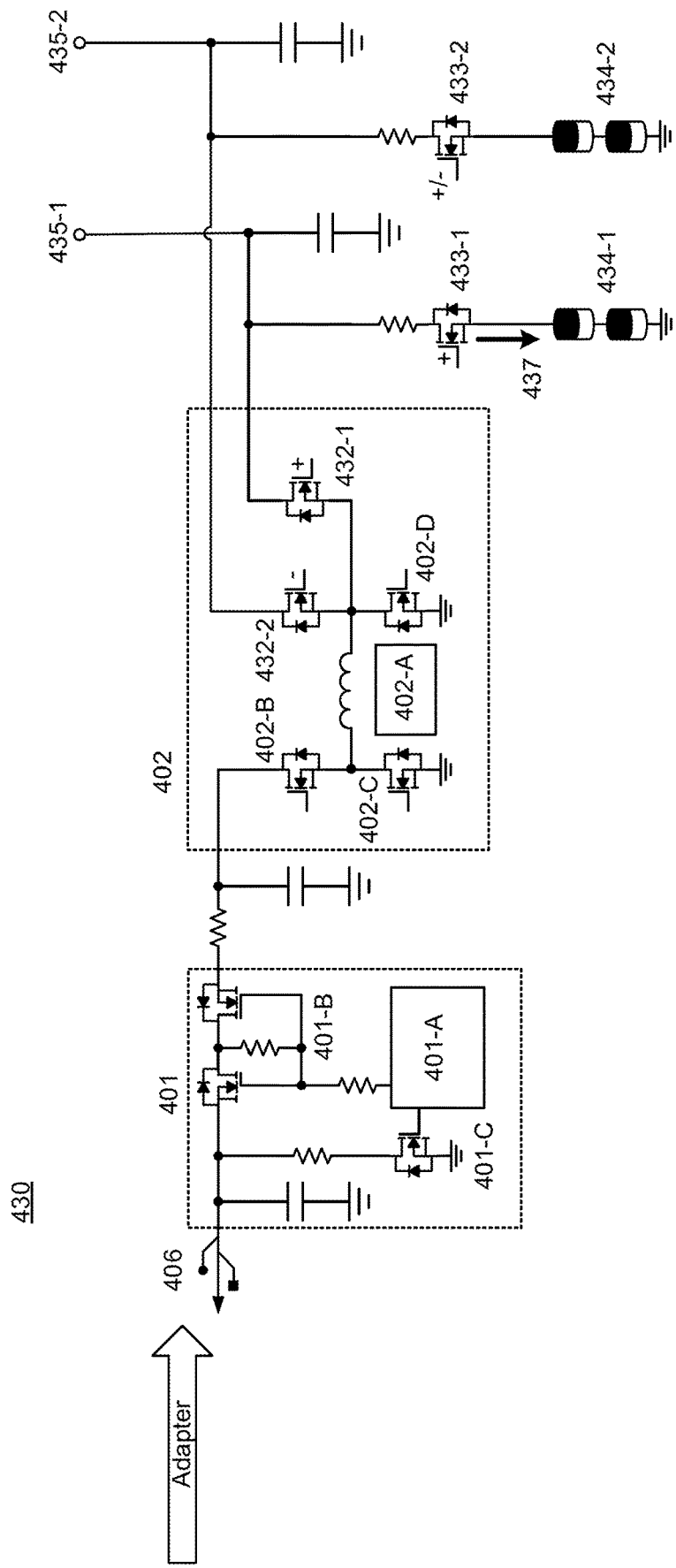
FIG. 4D illustrates an example operation of the battery charger in FIG. 3 in a second conditional charging mode of a first battery.

FIG. 4D illustrates an example operation of the battery charger in FIG. 3 in a second conditional charging mode of a first battery where the voltage level of battery 434-1 is less than or equal to the voltage level of battery 434-2. Exemplary system 430 illustrates the exemplary charger 402 operating in a second conditional charging mode delivering power to battery 434-1 and electrically isolating battery 434-2. In the exemplary second conditional charging mode of the system 430, switching transistor 432-1 is activated with a predetermined positive gate voltage, switching transistor 432-2 is deactivated with a predetermined negative or ground gate voltage, battery control transistor 433-1 is activated with a predetermined positive gate voltage, and battery control transistor 433-2 can be activated or deactivated depending on voltage level at system node 435-2. In response, exemplary charging current 437 flows to battery 434-1 from charger 402 through switching transistor 432-1 and battery control transistor 433-1, and battery 434-2 is electrically isolated from charger 402 by switching transistor 432-2.

Figure 4E:
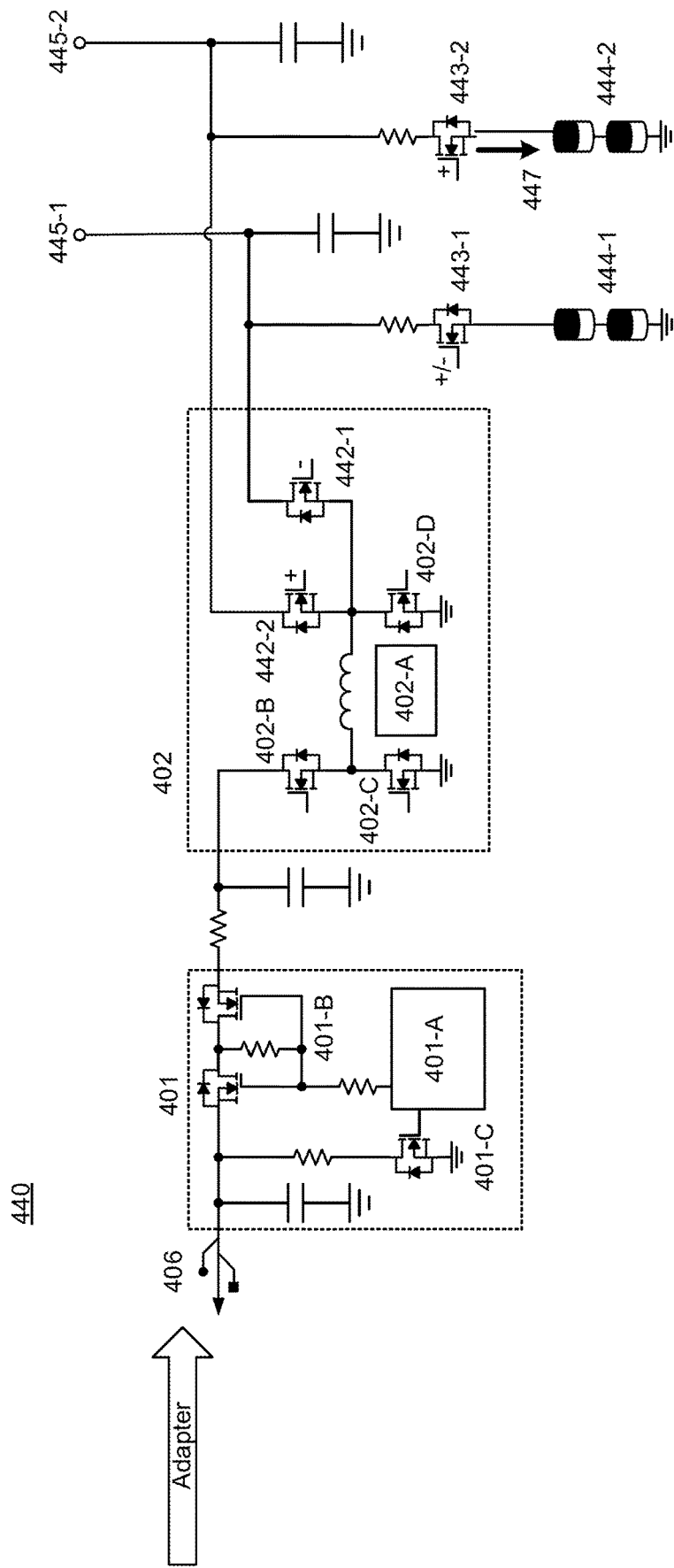
FIG. 4E illustrates an example operation of the battery charger in FIG. 3 in a third conditional charging mode of a second battery.

FIG. 4E illustrates an example operation of the battery charger in FIG. 3 in a third conditional charging mode of a second battery where the voltage level of battery 444-1 is greater than or equal to the voltage level of battery 444-2. Exemplary system 440 illustrates the exemplary charger 402 operating in a third conditional charging mode delivering power to battery 444-2 and electrically isolating battery 444-1. In the exemplary third conditional charging mode of the system 440, switching transistor 442-1 is deactivated with a predetermined negative or ground gate voltage, switching transistor 442-2 is activated with a predetermined positive gate voltage, battery control transistor 443-1 can be activated or deactivated depending on voltage level at system node 445-1 and battery control transistor 443-2 is activated with a predetermined positive gate voltage. In response, exemplary charging current 447 flows to battery 444-2 from charger 402 through switching transistor 442-2 and battery control transistor 443-2, and battery 444-1 is electrically isolated from charger 402 by switching transistor 442-1.

Figure 4F:
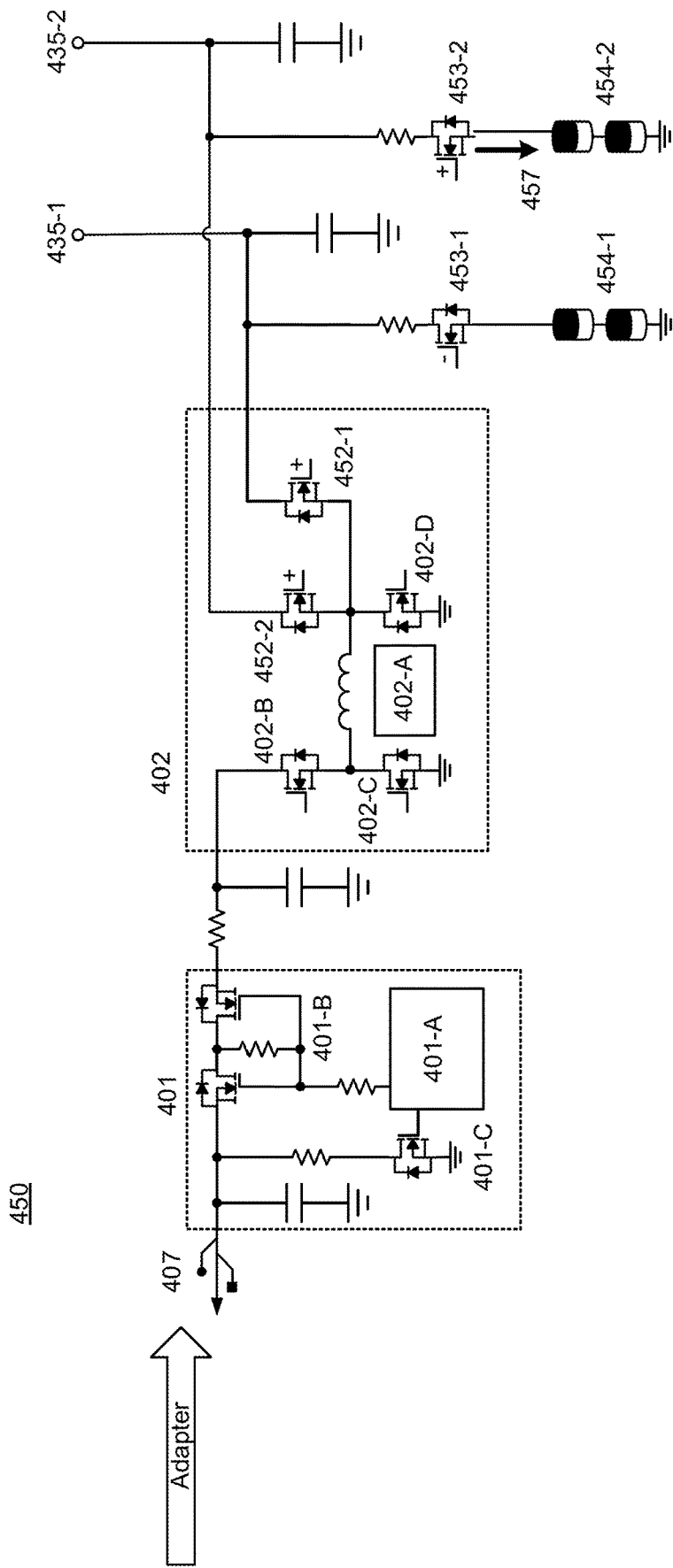
FIG. 4F illustrates an example operation of the battery charger in FIG. 3 in a fourth conditional charging mode of a second battery.

FIG. 4F illustrates an example operation of the battery charger in FIG. 3 in a fourth conditional charging mode of a second battery where the voltage level of battery 454-1 is less than the voltage level of battery 454-2. Exemplary system 450 illustrates the exemplary charger 402 operating in a fourth conditional charging mode delivering power to battery 454-2 and electrically isolating battery 454-1. In the exemplary fourth conditional charging mode of the system 450, switching transistor 452-1 is activated with a predetermined positive gate voltage, switching transistor 452-2 is activated with a predetermined positive gate voltage, switching transistor 453-1 is deactivated with a predetermined negative or ground gate voltage, and battery control transistor 453-2 is activated with a predetermined positive gate voltage. In response, exemplary charging current 457 flows to battery 454-2 from charger 402 through switching transistor 452-2 and battery control transistor 453-2, and battery 454-1 is electrically isolated from charger 402 by battery control transistor 453-1.

Figure 5:
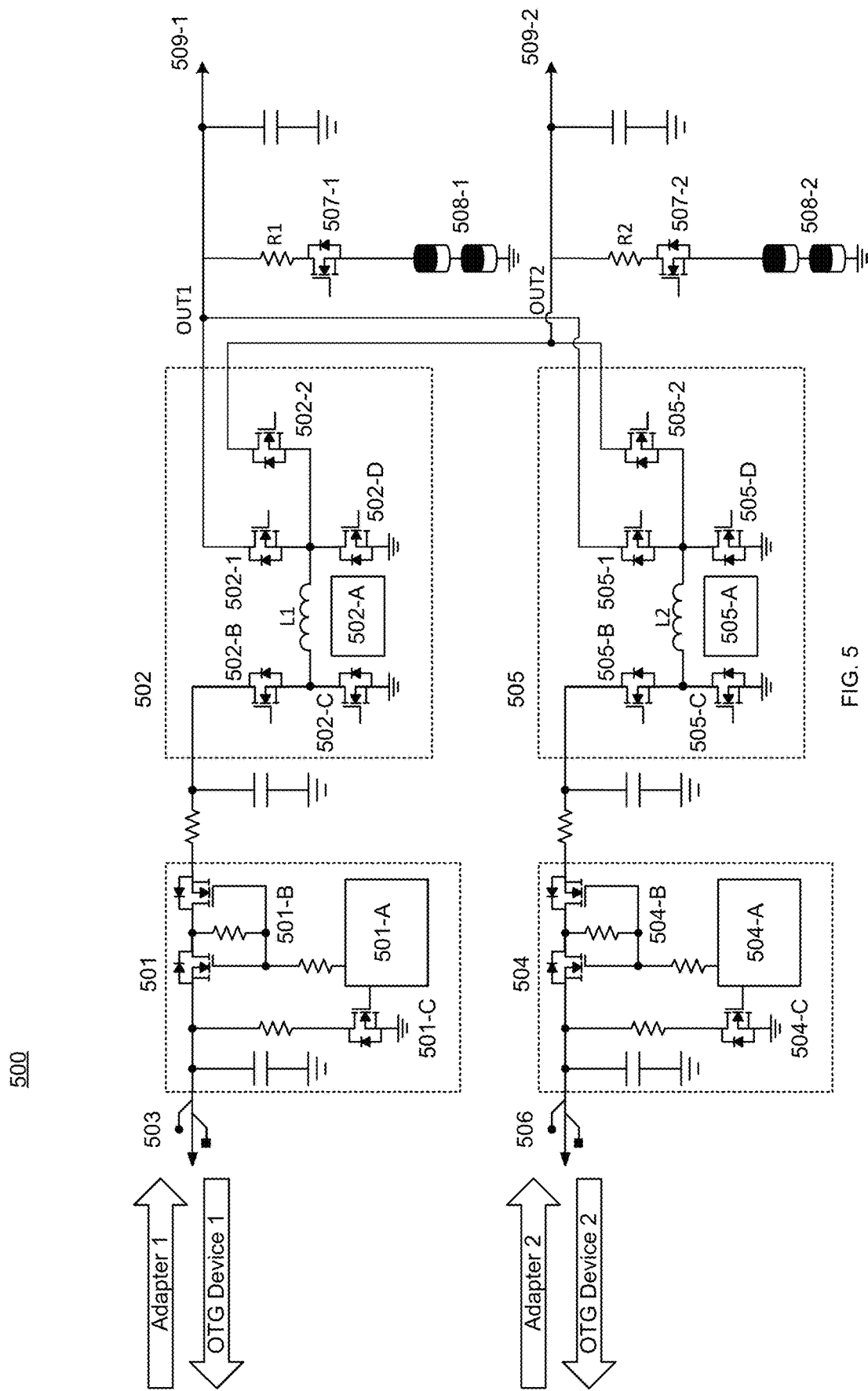
FIG. 5 is a block diagram illustrating an example adaptation of the charger in FIG. 3 for a Dual Type-C Ports application.

FIG. 5 is a block diagram illustrating an example adaptation of the charger in FIG. 3 for a Dual Type-C Ports application. FIG. 5 illustrates exemplary system 500 including exemplary first subsystem having a first port detection ("PD") controller 501 (having a pair of back-to-back transistors 501-B) and first charger 502 (including inductor L1) in accordance with the exemplary embodiments of FIG. 3, and exemplary second subsystem having a second port detection ("PD") controller 504 (having a pair of back-to-back transistors 504-B) and second charger 505 (including inductor L2) having structure corresponding to those of the first port detection ("PD") controller 501 and the first charger 502, respectively. In some embodiments, charger 502 and charger 505 provide output voltage to output node OUT1, output node OUT2, system node 509-1, system node 509-2, battery 508-1, and battery 508-2. In some embodiments, the charger 502 provides system power to system node 509-1 and system node 509-2, and charging power to battery 304-1 and battery 304-2. In some embodiments, the charger 502 and the charger 505 are connected connect in parallel to the output node OUT1, output node OUT2, battery 508-1, the battery 508-2, the system node 509-1, and the system node 509-2.

In some embodiments, two adapters may be connected respectively to ports 503 and 506. These adapters may supply charging power for batteries 508-1 and 508-2, and supply system node 509-1 and 509-2 via the chargers 502 and 505. In some embodiments, two OTG devices may be connected respectively to ports 503 and 506, where a full range of OTG voltage (e.g. from 5V to 20V) can be supported via the chargers 502 and 505. In one example, an adaptor can be connected to one port 503 or 506, and an OTG device can be connected to another port 503 or 506. The devices connected to the ports can be detected, for example, by TCPC functionality in PD-ICs 501-A and 504-A in PD controller modules 501 and 504, respectively.

In some embodiments, the system 500 supports bidirectional current flow to charge at least one of battery 508-1 and battery 508-2 (e.g. the adapter on port 503 or 506 is a source), or to supply power to an OTG device connected to port 503 or port 506 (e.g. where the OTG device on port 503 or 506 is a sink). In some embodiments, at least one BGATE FET 507-1 and resistor R1 is disposed between the parallel chargers 502 and 506, and battery 508-1. In some embodiments, at least one BGATE FET 507-2 and resistor R2 is disposed between the parallel chargers 502 and 506, and the battery 508-2. In some embodiments, the system 500 supplies charging power to one of the batteries 508-1 or 508-2 from either Adapter 1 or Adapter 2 respectively connected to either port 503 or 506. In addition, system 500 may in exemplary embodiments provide power from one of the batteries 508-1 or 508-2, to one or more of the system node 509-1, the system node 509-2, and OTG Device 1 or OTG Device 2 connected to the other one of the parts 503 and 506 not connected to either Adapter 1 or Adapter 2. Thus, the system 500 may concurrently charge one battery from an external adapter while providing power to a device subsystems or an external device.

Figure 6:
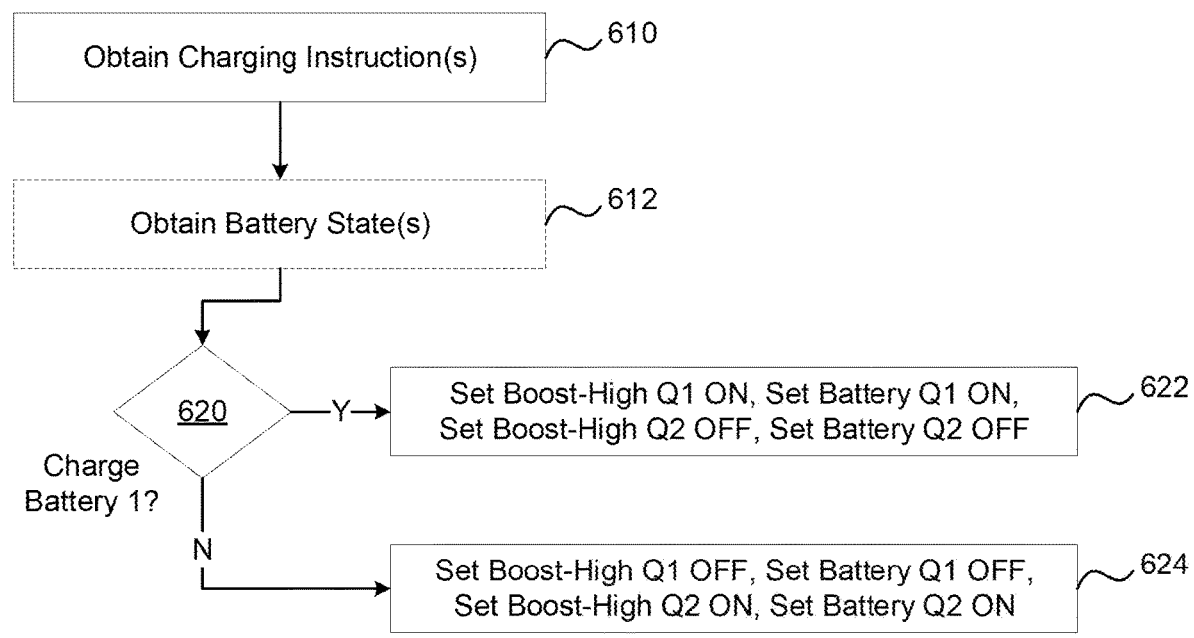
FIG. 6 illustrates an example method of operation of the battery charger in FIG. 3 in a plurality of charging modes.

FIG. 6 illustrates an example method 600 of operation of the battery charger in FIG. 3 in a plurality of charging modes. As exemplary system in operation in accordance with method 600 may include, but is not limited to, the system 300 and one or more of the operating states 4A and 4B associated therewith.

At step 610, the exemplary system obtains one or more charging instructions. The exemplary system may receive one or more instructions to charge at least one battery present in the exemplary system. Charging instructions may comprise one or more of logic levels, electrical input, magnetic input, digitized electrical signals, or the like. The method 600 then proceeds to step 612.

At step 612, the exemplary system optionally obtains one or more battery states. The exemplary system may receive one or more battery states corresponding to batteries present in the exemplary system. The battery states may include one or more battery characteristics, where battery characteristics may include a voltage level, a current level, a power level, or the like. The method 600 then proceeds to step 620.

At step 620, the exemplary system determines whether to charge a first battery. In an exemplary embodiment having two batteries, the method 600 may determine whether to charge a first battery based on the one or more charging instructions received at step 610. Because the exemplary system includes two batteries, the system will select one of the pair for charging regardless of which determination occurs. It is to be understood that an exemplary system may include alternate or complementary battery selection logic, and may include various additional or substitute states in which including a determination to charge no batteries or a determination to charge a battery among a plurality of batteries greater than two. If the charging instructions designate charging of a first battery of the pair, then the method proceeds to step 622. Alternatively, if the charging instructions designate charging of a second battery of the pair, then the method proceeds to step 624.

At step 622, the exemplary system enters a first charging mode. In the exemplary first charging mode of step 622, at least four transistors in the exemplary system enter or remain in particular states. A first charger switching transistor coupled to a first system node is or remains activated; a first battery control transistor coupled to the first system node is or remains activated; a second charger switching transistor coupled to a second system node is or remains deactivated; and a second battery control transistor coupled to the second system node is or remains deactivated. The first and second charger switching transistors may respectively each comprise, in various embodiments, a boost-high transistor in a buck-boost voltage regulator. At step 622, current may flow to the first battery while current is isolated from the second battery.

At step 624, the exemplary system enters a second charging mode. In the exemplary second charging mode of step 624, the at least four transistors in the exemplary system enter or remain in particular states. The first charger switching transistor coupled to the first system node is or remains deactivated; the first battery control transistor coupled to the first system node is or remains deactivated; the second charger switching transistor coupled to the second system node is or remains activated; and the second battery control transistor coupled to the second system node is or remains activated. At step 624, current may flow to the second battery while current is isolated from the first battery.

It should be apparent that one or all of steps 610 to 624 may be repeated indefinitely, for example in accordance with one or more switching cycles in a PWM modulation scheme.

Figure 7:
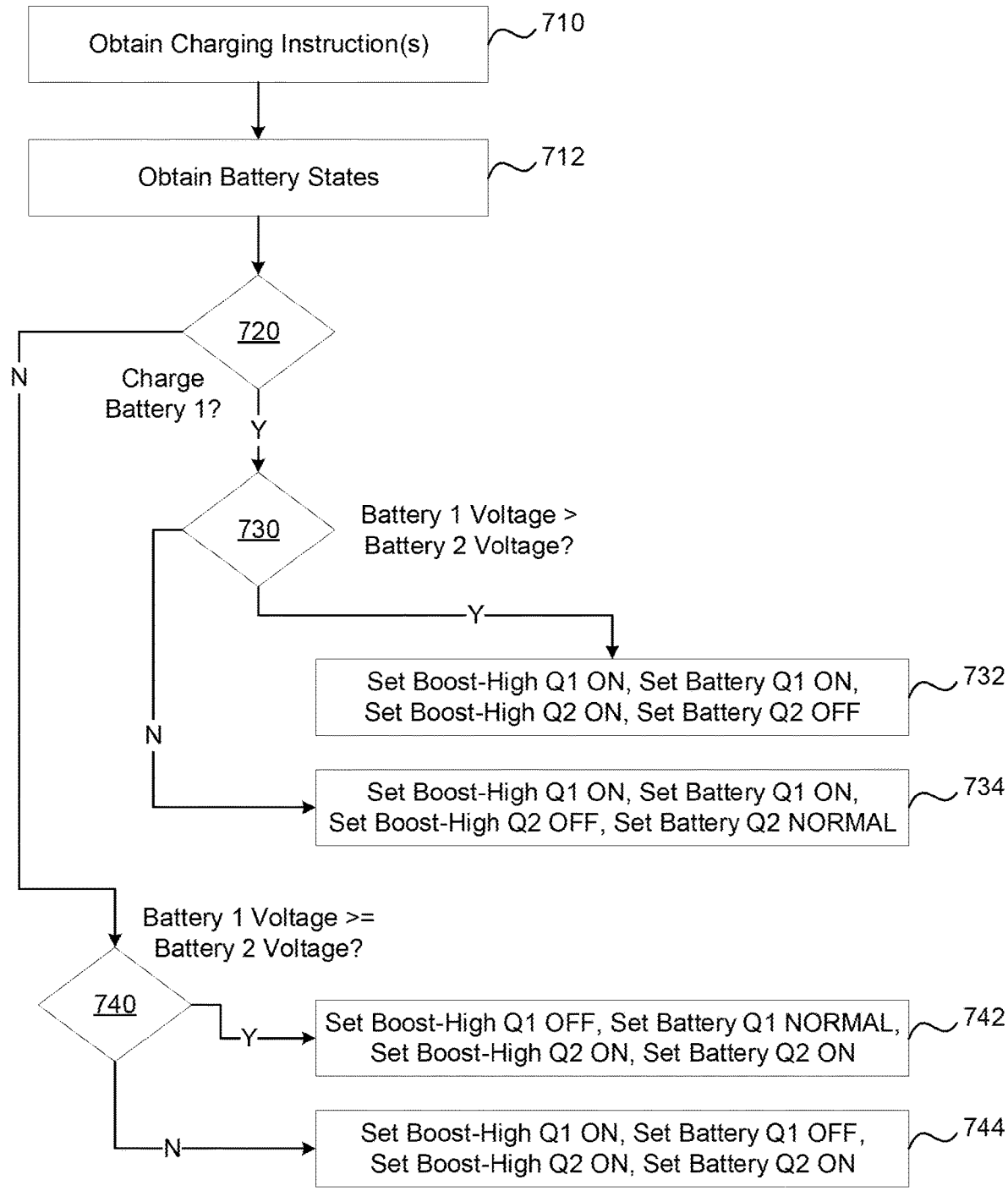
FIG. 7 illustrates an example method of operation of the battery charger in FIG. 3 in a plurality of conditional charging modes.

FIG. 7 illustrates an example method 700 of operation of the battery charger in FIG. 3 in a plurality of conditional charging modes. As exemplary system in operation in accordance with method 700 may include, but is not limited to, the system 300 and one or more of the operating states 4C-4F associated therewith.

At step 710, the exemplary system obtains one or more charging instructions. The exemplary system may receive one or more instructions to charge at least one battery present in the exemplary system. Charging instructions may comprise one or more of logic levels, electrical input, magnetic input, digitized electrical signals, or the like. The method 700 then proceeds to step 712.

At step 712, the exemplary system obtains a first battery state of a first battery and a second battery state of a second battery. The exemplary system may receive one or more battery states corresponding to batteries present in the exemplary system. The battery states may include one or more battery characteristics, where battery characteristics may include a voltage level, a current level, a power level, or the like. In some implementations, the exemplary system includes two batteries, and battery states includes a first voltage across a first battery and a second voltage across a second battery. The method 700 then proceeds to step 720.

At step 720, the exemplary system determines whether to charge the first battery. In an exemplary embodiment having two batteries, the method 700 may determine whether to charge a first battery based on the one or more charging instructions received at step 710. Because the exemplary system includes two batteries, the system will select one of the pair for charging regardless of which determination occurs. As discussed above with respect to method 600, it is to be understood that an exemplary system may include alternate or complementary battery selection logic, and may include various additional or substitute states in which including a determination to charge no batteries or a determination to charge a battery among a plurality of batteries greater than two. If the charging instructions designate charging of a first battery of the pair, then the method proceeds to step 730. Alternatively, if the charging instructions designate charging of a second battery of the pair, then the method proceeds to step 740.

At step 730, the exemplary system determines whether the first voltage of the first battery is greater than the second voltage of the second battery. The method 700 may determine, at step 730, whether the voltage of the first battery is greater than the voltage of the second battery. It is to be understood that the exemplary system may conduct a determination at step 730 with any threshold or combination of thresholds, or with any criterion or criteria in accordance with the present embodiments, and that the exemplary system is thus not limited to the determination of step 730. If the first voltage is greater than the second voltage, then the method 700 proceeds to step 732. Alternatively, if the first voltage is not greater than the second voltage, then the method 700 proceeds to step 734.

At step 732, the exemplary system enters a first conditional charging mode. In the exemplary first conditional charging mode of step 732, at least four transistors in the exemplary system enter or remain in particular states. A first charger switching transistor coupled to a first system node is or remains activated; a first battery control transistor coupled to the first system node is or remains activated; a second charger switching transistor coupled to a second system node is or remains activated; and a second battery control transistor coupled to the second system node is or remains deactivated. As discussed above with respect to method 600, the first and second charger switching transistors may respectively each comprise, in various embodiments, a boost-high transistor in a buck-boost voltage regulator. At step 732, current may flow to the first battery while current is isolated from the second battery.

At step 734, the exemplary system enters a second conditional charging mode. In the exemplary second conditional charging mode of step 734, the at least four transistors in the exemplary system enter or remain in particular states. The first charger switching transistor coupled to the first system node is or remains activated; the first battery control transistor coupled to the first system node is or remains activated; the second charger switching transistor coupled to the second system node is or remains deactivated; and the second battery control transistor coupled to the second system node is or remains activated or deactivated. At step 734, current may flow to the first battery while current is isolated from the second battery.

At step 740, the exemplary system determines whether the first voltage across the first battery is greater than or equal to the second voltage across the second battery. The method 700 may determine, at step 740, whether the voltage of the first battery is greater than or equal to the voltage of the second battery. It is to be understood that the exemplary system may conduct a determination at step 740 with any threshold or combination of thresholds, or with any criterion or criteria in accordance with the present embodiments, and that the exemplary system is thus not limited to the determination of step 740. If the first voltage is greater than or equal to the second voltage, then the method 700 proceeds to step 742. Alternatively, if the first voltage is not greater than or equal to the second voltage, then the method 700 proceeds to step 744.

At step 742, the exemplary system enters a third conditional charging mode. In the exemplary third conditional charging mode of step 742, the at least four transistors in the exemplary system enter or remain in particular states. The first charger switching transistor coupled to the first system node is or remains deactivated; the first battery control transistor coupled to the first system node is or remains activated or deactivated; the second charger switching transistor coupled to the second system node is or remains activated; and the second battery control transistor coupled to the second system node is or remains activated. At step 742, current may flow to the second battery while current is isolated from the first battery.

At step 744, the exemplary system enters a fourth conditional charging mode. In the exemplary fourth conditional charging mode of step 744, the at least four transistors in the exemplary system enter or remain in particular states. The first charger switching transistor coupled to the first system node is or remains activated; the first battery control transistor coupled to the first system node is or remains deactivated; the second charger switching transistor coupled to the second system node is or remains activated; and the second battery control transistor coupled to the second system node is or remains activated. At step 744, current may flow to the second battery while current is isolated from the first battery.

It should be apparent that one or all of steps 710 to 744 may be repeated indefinitely, for example in accordance with one or more switching cycles in a PWM modulation scheme.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B.

Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A device comprising:
   a first subsystem configured to couple with a second subsystem, the first subsystem configured to operate in a plurality of alternating charging modes and including a first pair of back-to-back input transistors, wherein each of the input transistors of the first pair of back-to-back input transistors comprise electrically connected drain terminals and electrically connected gate terminals to provide a first input voltage to the first subsystem;
   a first inductor electrically coupled with a first inductor node;
   a first transistor directly electrically connected with the first inductor node at the source of the first transistor and a first output node at a drain of the first transistor and providing a first output voltage based on the first input voltage provided by the first pair of back-to-back input transistors;
a first battery electrically coupled with the first output node, the first battery having a first voltage capacity;
a second transistor electrically connected with the first output node, via a first output resistor, at a drain terminal of the second transistor and directly electrically connected to the first battery at a source terminal of the second transistor;
the second subsystem configured to couple with the first subsystem at either the first output node or a second output node, the second subsystem configured to operate in a plurality of alternating charging modes in cooperation with the first subsystem and including a second pair of back-to-back input transistors, wherein each of the input transistors of the second pair of back-to-back input transistors comprise electrically connected drain terminals and electrically connected gate terminals to provide a second input voltage to the second subsystem;
a third transistor electrically connected with the first inductor node at a source terminal of the third transistor and the second output node at a drain terminal of the third transistor providing a second output voltage based on the first input voltage;
a fourth transistor electrically connected with the second output node at a drain terminal of the fourth transistor;
a second battery electrically coupled with the second output node, the second battery having a second voltage capacity; and
the first transistor, the second transistor, the third transistor, and the fourth transistor electrically coupled with and activated and deactivated by a controller,
wherein the first subsystem and the second subsystem are electrically coupled in parallel with both the first output node and second output node, and the first battery and the second battery.

2. The device of claim 1, wherein the first pair of back-to-back input transistors is configured to couple to either an adapter or an on-the-go (OTG) device.

3. The device of claim 1, wherein the second pair of back-to-back input transistors is configured to couple to either an adapter or an on-the-go (OTG) device.

4. The device of claim 1, further comprising:
a fifth transistor directly electrically connected with the first inductor node;
a sixth transistor directly electrically connected with a second inductor node; and
a seventh transistor directly electrically connected with the second inductor node,
wherein the first inductor is directly electrically connected with the second inductor node.

5. The device of claim 4, wherein the first transistor and the second transistor are active, and the third transistor and the fourth transistor are inactive.

6. The device of claim 4, wherein the first transistor and the second transistor are inactive, and the third transistor and the fourth transistor are active.

7. The device of claim 4, wherein the first transistor, the second transistor and the third transistor are active, and the fourth transistor is inactive.

8. The device of claim 4, wherein the first transistor, the third transistor and the fourth transistor are active, and the second transistor is inactive.

9. The device of claim 4, further comprising:
a second inductor directly electrically connected with a third inductor node;
an eighth transistor directly electrically connected with the third inductor node and the first output node; and
a ninth transistor directly electrically connected with the third inductor node and the second output node.

10. A method comprising:
obtaining one or more charging instructions from a controller at a charging device;
determining whether to charge a first battery with a first battery capacity via a first subsystem configured to couple with a second subsystem, the first subsystem configured to operate in a plurality of alternating charging modes by operating a first pair of back-to-back input transistors, wherein each of the input transistors of the first pair of back-to-back input transistors comprise electrically connected drain terminals and electrically connected gate terminals to provide a first input voltage or to charge a second battery via the second subsystem configured to couple with the first subsystem, the second subsystem configured to operate in a plurality of alternating charging modes by operating a second pair of back-to-back input transistors, wherein each of the input transistors of the second pair of back-to-back input transistors comprise electrically connected drain terminals and electrically connected gate terminals to provide a second input voltage to the second subsystem, in response to the obtained one or more charging instructions;
operating the charging device in a first charging mode to charge the first battery, by activating a first transistor and a second transistor of the charging device, deactivating a third transistor, and conditionally deactivating a fourth transistor of the charging device, in response to a determination to charge the first battery, wherein the first transistor is directly electrically connected with a first inductor node at a source terminal of the first transistor and is directly electrically connected to a first output node at a drain of the first transistor and the second transistor is electrically connected with the first output node, via a first output resistor, at a drain terminal of the second transistor and directly electrically connected to the first battery at a source terminal of the second transistor;
operating the charging device in a second charging mode to charge the second battery within a second battery capacity, in response to a determination to charge the second battery; and
configuring the first subsystem and the second subsystem to be electrically coupled in parallel with both the first output node and second output node, and the first battery and the second battery.

11. The method of claim 10, wherein the operating the charging device in the second charging mode comprises activating the third transistor and the fourth transistor of the charging device, and deactivating the first transistor and the second transistor of the charging device.

12. The method of claim 10, wherein the first pair of back-to-back input transistors is configured to couple to either an adapter or an on-the-go (OTG) device.

13. The method of claim 10, wherein the second pair of back-to-back input transistors is configured to couple to either an adapter or an on-the-go (OTG) device.

14. The method of claim 10, further comprising:
obtaining a first operating characteristic associated with the first battery; and
obtaining a second operating characteristic associated with the second battery,
wherein the operating the charging device in the first charging mode comprises determining whether the first operating characteristic satisfies a first condition, operating the charging device in a first conditional charging mode in accordance with a determination that the first operating characteristic satisfies the first condition, and operating the charging device in a second conditional charging mode in accordance with a determination that the first operating characteristic does not satisfy the first condition.

15. The method of claim 14, wherein the operating the charging device in the second charging mode comprises determining whether the second operating characteristic satisfies a second condition, operating the charging device in a third conditional charging mode in accordance with a determination that the second operating characteristic satisfies the second condition, and operating the charging device in a fourth conditional charging mode in accordance with a determination that the second operating characteristic does not satisfy the second condition.

16. The method of claim 14, wherein the first operating characteristic comprises a voltage, and the first condition comprises a determination whether a voltage across the first battery is greater than a voltage across the second battery.

17. The method of claim 15, wherein the second operating characteristic comprises a voltage, and the second condition comprises a determination whether a voltage across the first battery is greater than or equal to a voltage across the second battery.

18. The method of claim 15, wherein the operating the charging device in the third conditional charging mode comprises activating the second transistor and the fourth transistor of the charging device, and deactivating the first transistor and activating or deactivating the third transistor of the charging device.

19. The method of claim 15, wherein the operating the charging device in the fourth conditional charging mode comprises activating the first transistor, the third transistor and the fourth transistor of the charging device, and deactivating the second transistor of the charging device.

* * * * *